(12) United States Patent
Fu et al.

(10) Patent No.: US 11,489,574 B2
(45) Date of Patent: Nov. 1, 2022

(54) METHOD AND USER EQUIPMENT FOR TRANSMITTING CHANNEL STATE INFORMATION

(71) Applicant: SAMSUNG ELECTRONICS CO., LTD., Suwon-si (KR)

(72) Inventors: Jingxing Fu, Beijing (CN); Bin Yu, Beijing (CN); Chen Qian, Beijing (CN); Di Su, Beijing (CN); Qi Xiong, Beijing (CN); Yingjie Zhang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 83 days.

(21) Appl. No.: 16/345,540

(22) PCT Filed: Jan. 10, 2018

(86) PCT No.: PCT/KR2018/000483
§ 371 (c)(1),
(2) Date: Apr. 26, 2019

(87) PCT Pub. No.: WO2018/139785
PCT Pub. Date: Aug. 2, 2018

(65) Prior Publication Data
US 2019/0312622 A1      Oct. 10, 2019

(30) Foreign Application Priority Data

Jan. 26, 2017 (CN) .......................... 201710057368.5
Sep. 14, 2017 (CN) .......................... 201710825445.7

(51) Int. Cl.
*H04L 12/00* (2006.01)
*H04B 7/06* (2006.01)
(Continued)

(52) U.S. Cl.
CPC .......... *H04B 7/0626* (2013.01); *H04W 24/08* (2013.01); *H04W 72/0413* (2013.01); *H04W 72/0446* (2013.01)

(58) Field of Classification Search
None
See application file for complete search history.

(56) References Cited

U.S. PATENT DOCUMENTS

2015/0195070 A1\* 7/2015 Kim ..................... H04J 11/0093
370/329
2016/0135070 A1 5/2016 Lee et al.
(Continued)

FOREIGN PATENT DOCUMENTS

CN        105099632 A     11/2015

OTHER PUBLICATIONS

MCC Support "Draft Report of 3GPP TSG RAN WG1 #82bis v0.1.0 (Malmo, Sweden, Oct. 5-9, 2015)" 3GPP TSG RAN WG1 Meeting #83, R1-15XXXX, Anaheim, USA, Nov. 15-22, 2015, (103 pages total) XP051041936.

(Continued)

*Primary Examiner* — Noel R Beharry
*Assistant Examiner* — Lionel Preval
(74) *Attorney, Agent, or Firm* — Sughrue Mion, PLLC

(57) ABSTRACT

A pre-5G or 5G communication system for transmitting channel state information (CSI) by determining CSI transmission configuration information that comprises transmission times k of periodic CSI report in one subframe and transmitting CSI report according to the CSI transmission configuration information. Thereby, transmission efficiency of uplink control information (UCI) in a higher frequency spectrum resource environment of 5G technology may be improved and transmission efficiency and transmission performance of UCI may be ensured by introducing a smaller (Continued)

time unit for data scheduling and configuring a smaller CSI report period.

16 Claims, 13 Drawing Sheets

(51) Int. Cl.
*H04W 24/08* (2009.01)
*H04W 72/04* (2009.01)

(56) References Cited

U.S. PATENT DOCUMENTS

| | | | |
|---|---|---|---|
| 2016/0269160 A1 | 9/2016 | Noh et al. | |
| 2017/0048039 A1 | 2/2017 | Zhao et al. | |
| 2018/0034523 A1* | 2/2018 | Kim | H04B 7/0639 |
| 2018/0123848 A1* | 5/2018 | Nammi | H04L 27/2646 |
| 2018/0278301 A1* | 9/2018 | Kim | H04W 72/085 |
| 2019/0140723 A1* | 5/2019 | Yum | H04L 5/0057 |
| 2019/0229874 A1* | 7/2019 | Lee | H04L 5/005 |
| 2019/0245603 A1* | 8/2019 | Yum | H04B 7/0617 |
| 2019/0261380 A1* | 8/2019 | Iyer | H04B 7/0695 |
| 2019/0372642 A1* | 12/2019 | Kakishima | H04L 5/0053 |

OTHER PUBLICATIONS

Communication dated May 15, 2020, issued by the European Patent Office in European Application No. 18744987.1.
Intel Corporation, "Discussion on NR CSI configuration", R1-1611984; 3GPP TSG RAN WG1 Meeting #87, Nov. 6, 2016, pp. 1-5 (7 pages total).
LG Electronics et al., "WF on CSI timing for NR", R1-1613431, 3GPP TSG RAN WG1 Meeting #87, Nov. 19, 2016, (6 pages total).
NTT Docomo, Inc., "Views on CSI feedback for shortened TTI with reduced processing time", R1-1612699, 3GPP TSG RAN WG1 Meeting #87, Nov. 5, 2016, pp. 1-7 (9 pages total).
Nokia et al., "On CSI and SRS Timing wiht 1-ms TTI", R1-1612931, 3GPP TSG RAN WG1 Meeting #87, Nov. 4, 2016, (5 pages total).
International Search Report (PCT/ISA/210) dated Apr. 17, 2018 issued by the International Searching Authority in International Application No. PCT/KR2018/000483.
Written Opinion (PCT/ISA/237) dated Apr. 17, 2018 issued by the International Searching Authority in International Application No. PCT/KR2018/000483.
Communication dated Sep. 30, 2021 issued by the China National Intellectual Property Administration in Chinese Application No. 201710825445.7.

* cited by examiner

METHOD AND USER EQUIPMENT FOR TRANSMITTING CHANNEL STATE INFORMATION

CROSS-REFERENCE TO RELATED APPLICATION(S)

This application is a National Phase Entry of PCT International Application No. PCT/KR2018/000483, which was filed on Jan. 10, 2018, and claims priority to Chinese Patent Application No. 201710057368.5, which was filed in the Chinese Intellectual Property Office on filed on Jan. 26, 2017, and Chinese Patent Applications No. 201710825445.7, which was filed in the Chinese Intellectual Property Office on filed on Sep. 14, 2017 the entire disclosure of each of these applications is incorporated herein by reference.

TECHNICAL FIELD

The present disclosure relates generally to the technical field of wireless communication, and in particular, to a method and a user equipment (UE) in order to transmit channel state information.

BACKGROUND ART

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Uplink control information (UCI) in LTE or LTE related radio access technologies may comprise at least one of channel state information (CSI), hybrid automatic retransmission request-acknowledgement (HARQ-ACK) and scheduling request (SR). CSI report is the information which base station requests a user equipment (UE) to report in order to obtain downlink channel quality. The base station transmits CSI reference resources in downlink transmission (from base station to UE), and UE feedbacks CSI report to the base station in uplink transmission (from UE to base station) after it measures the CSI reference resource. CSI reference resources comprise channel state information-reference signal (CSI-RS) and/or channel state information-interference measurement (CSI-IM). CSI report may be classified into periodic CSI report, semi-continuous CSI report and non-periodic CSI report. The periodic CSI report and semi-continuous CSI report can be transmitted on a physical uplink shared channel (PUSCH) or on a physical uplink control channel (PUCCH), and non-periodic CSI report can be transmitted on a PUSCH. The period and time-offset of periodic CSI report are configured by a higher layer signaling.

In LTE, a length of a subframe is constant, data scheduling takes the subframe length as a time unit, and both of the timing relationship of CSI report and the timing relationship of CSI reference resources take a subframe length as a time unit. When shorter time unit is introduced in data scheduling and higher frequency spectrum resource is applied in the 5th generation (5G) mobile communication system, the time selectivity of a channel is enhanced due to Doppler Effect. If CSI report is still transmitted in a way like that in the LTE, CSI report in data scheduling units with different time length cannot be transmitted jointly for different cells, resulting in that CSI report cannot be transmitted in time or transmission performance of CSI report degrades.

In view of this, it is necessary to provide a method and a user equipment for transmitting CSI report to solve the above technical problems.

DISCLOSURE OF INVENTION

Technical Problem

The present disclosure is designed to address at least the problems and/or disadvantages described above and to provide at least the advantages described below.

Accordingly, an object of the present disclosure is to overcome shortcomings of the prior art and provides a method and a user equipment for transmitting a channel state information (CSI) report which have desirable transmission performance and efficiency.

Solution to Problem

In accordance with an aspect of the present disclosure, a method for transmitting a channel state information (CSI) report The method comprises: determining CSI transmission configuration information that comprises a transmission times k of a periodic CSI report in one subframe; and transmitting the CSI report according to the CSI transmission configuration information.

Preferably, the step of transmitting the CSI report according to the CSI transmission configuration information comprises steps of: determining a type of the CSI report according to the CSI transmission configuration information; and transmitting the CSI report on a physical uplink control channel (PUCCH) or a physical uplink shared channel (PUSCH) if the CSI report is a periodic CSI report, or transmitting CSI report on a PUSCH if the CSI report is a non-periodic CSI report.

Preferably, the step of determining CSI transmission configuration information comprises a step of: determining k according to one or more of an indication from a received radio resource control (RRC) layer signaling, an indication from a received media access control (MAC) layer signaling, an indication from received system information, a predefined rule and an attribute of resource for transmitting a PUCCH.

Preferably, the attribute of the resource for transmitting PUCCH comprises a space size of subcarrier for transmitting PUCCH.

Preferably, the CSI transmission configuration information further comprises a time-offset $N_{OFFSET1}$ of CSI report time-domain position relative to a first reference point, a time unit $U_{OFFSET1}$ of $N_{OFFSET1}$, a transmission period $N_p$ of the periodic CSI report, and a time unit $U_p$ of $N_p$, wherein $N_{OFFSET1}$ is an integral multiple of $U_{OFFSET1}$ and $N_p$ is an integral multiple of $U_p$. The step of determining CSI transmission configuration information comprises one or more of the following operations of: determining $N_{OFFSET1}$ according to one of an indication from a received RRC layer signaling, an indication from a received MAC layer signaling, an indication from received system information, a predefined rule and k; determining $U_{OFFSET1}$ according to one of an indication from a received RRC layer signaling, an indication from a received MAC layer signaling, an indication from received system information, a predefined rule and k; determining $N_p$ according to one of an indication from a received RRC layer signaling, an indication from a received MAC layer signaling, an indication from received system information, a predefined rule and k; and determining $U_p$ according to one of an indication from a received RRC layer signaling, an indication from a received MAC layer signaling, an indication from received system information, a predefined rule and k.

Preferably, $U_p$ comprises a length of a subframe, a length of a time slot or a length of orthogonal frequency division multiplexing (OFDM) symbol.

Preferably, $U_{OFFSET1}$ is the length of a subframe; the CSI transmission configuration information further comprises a time offset $N_{OFFSET2}$ of CSI report time-domain position relative to a second reference point, a time unit $U_{OFFSET2}$ of $N_{OFFSET2}$ is the length of a time slot and $N_{OFFSET2}$ is an integral multiple of $U_{OFFSET2}$; and the second reference point is a subframe-header of a subframe determined by $N_{OFFSET1}$.

Preferably, the CSI transmission configuration information further comprises a time-offset $N_{CQI\_ref}$ of CSI report time-domain position relative to a corresponding CSI reference resource time-domain position; and the step of determining CSI transmission configuration information comprises determining $N_{CQI\_ref}$ according to one of an indication from a received RRC layer signaling, an indication from a received MAC layer signaling, an indication from a received physical layer signaling, an indication from received system information, a predefined rule, an attribute of resource for transmitting PUCCH and an attribute of CSI reference resource.

Preferably, the attribute of CSI reference resource comprises a space size of the subcarrier for transmitting CSI reference resource and/or a time unit $U_{CQI\_ref}$ of $N_{CQI\_ref}$, and $N_{CQI\_ref}$ is an integral multiple of $U_{CQI\_ref}$.

Preferably, the CSI transmission configuration information further comprises a time offset $N_{OFFSET1}$ of CSI time-domain position relative to a first reference point, a time unit $U_{OFFSET1}$ of $N_{OFFSET1}$, a transmission period $N_p$ of the periodic CSI report, a time unit $U_p$ of $N_p$, a time offset $N_{CQI\_ref}$ of CSI report time-domain position relative to a time-domain position of corresponding CSI reference resource, a time unit $U_{CQI\_ref}$ of $N_{CQI\_ref}$ and a time unit U of time correspondence between CSI reference resource and CSI report. The time correspondence between CSI reference resource and CSI report is, for example, difference between the time-domain position of the CSI reference resource and that of the CSI report. $N_{OFFSET1}$ is an integral multiple of $U_{OFFSET1}$, $N_p$ is an integral multiple of $U_p$ and $N_{CQI\_ref}$ is an integral multiple of $U_{CQI\_ref}$. The step of determining CSI transmission configuration information comprises determining U according to one of an indication from a received RRC layer signaling, an indication from a received MAC layer signaling, an indication from a received physical layer signaling, an indication from received system information, a predefined rule, and respective values of $U_{OFFSET1}$, $U_p$ and $U_{CQI\_ref}$.

Preferably, determining U according to respective values of $U_{OFFSET1}$, $U_p$ and $U_{CQI\_ref}$ comprise one or more of the following operations of: determining U to be equal to $U_{OFFSET1}$; determining U to be equal to $U_p$; determining U to be equal to $U_{CQI\_ref}$; determining U to be equal to a maximum among $U_{OFFSET1}$, $U_p$ and $U_{CQI\_ref}$; and determining U to be equal to a minimum among $U_{OFFSET1}$, $U_p$ and $U_{CQI\_ref}$.

In accordance with another aspect of the present disclosure, a user equipment (UE) is provided for transmitting a channel state information (CSI) report. The UE comprises a configuration determining module configured to determine CSI transmission configuration information that comprises transmission times of a periodic CSI report in one subframe, and a CSI report transmitting module configured to transmit a CSI report according to the CSI transmission configuration information.

Compared with the prior art, the present disclosure may provide technical effects as follows. UE is allowed to transmit periodic CSI report more than once in a subframe, which makes the transmission period of periodic CSI report smaller than the time length of a subframe and thus allows introducing a smaller time unit for data scheduling and configuring a smaller CSI report period. Therefore, the transmission efficiency of UCI may be improved in a higher frequency spectrum resource environment of 5G technology.

BRIEF DESCRIPTION OF DRAWINGS

In order to illustrate the technical solutions of the embodiments of the present disclosure more clearly, the drawings accompanying the description of the embodiments will be briefly described as follows. Obviously, the drawings illustrate only some of the embodiments of the present disclosure. For those skilled in the art, other drawings may be obtained from these drawings without any creative work.

MODE FOR THE INVENTION

Figure 1:
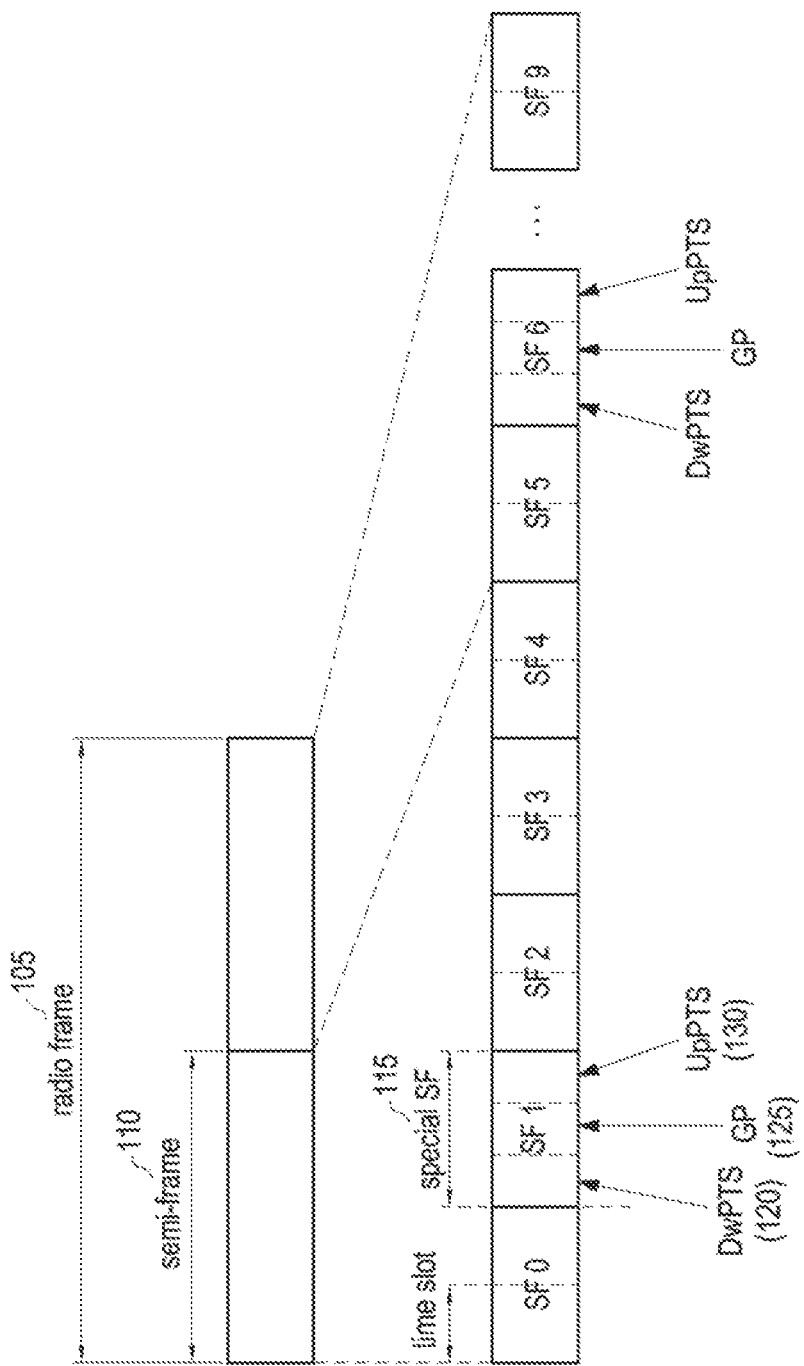
FIG. 1 schematically illustrates a structure of a frame under time division duplex (TDD) mode of LTE.

In order to facilitate better understanding of the technical solutions of the embodiments by those skilled in the art, the technical solutions of the embodiments will be described clearly and completely hereinafter in conjunction with the drawings accompanying the embodiments.

Some processes described in the description, claims and the drawings may comprise a plurality of operations that are described in a certain order. However, it should be understood that these operations may be executed in an order rather than the order in which they are described herein or executed in parallel. The reference numbers indicating the operations, such as 101 and 102, are merely used for distinguishing different operations, and the reference numbers themselves do not represent any execution order. In addition, these processes may comprise more or less operations, and these operations may be executed sequentially or in parallel. It is to be noted that the word such as "first" and "second" are used for distinguishing different messages, devices, modules or the like, which neither indicate any sequences nor define different types.

Technical solutions of the embodiments will be explained clearly and completely hereinafter in conjunction with the accompanying drawings. Obviously, the embodiments described herein are only some of rather than all of the embodiments of the present disclosure. Any other embodiments obtained by those skilled in the art based on the embodiments without any creative work will fall into the protection scope of the present disclosure.

Each block of the flowchart illustrations, and combinations of blocks in the flowchart illustrations, can be implemented by computer program instructions. The computer program instructions can be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). In some alternative implementations, the functions noted in the blocks may occur in a different order. For example, two blocks illustrated in succession may in fact be executed substantially concurrently or the blocks may sometimes be executed in the reverse order, depending upon the functionality involved.

Herein, the term "unit" may indicate a software or hardware component, such as a field-programmable gate array (FPGA) or an application specific integrated circuit (ASIC), and a "unit" performs any function. However, a "unit" or "module" is not limited to software or hardware. A "unit" or "module" may be constructed either to be stored in an addressable storage medium or to execute one or more processors. Therefore, a "unit" or "module" may include, e.g., software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by a "unit" or "module" may be either combined into a smaller number of elements, "units", or "modules" or divided into a larger number of elements, "units", or "modules". The elements, "units" and/or "modules" may be implemented to reproduce one or more central processing units (CPUs) within a device or a security multimedia card.

Although embodiments of the present disclosure are described below with reference to an OFDM-based wireless communication system, the present disclosure is also applicable to other communication systems and services having similar technical backgrounds.

Long term evolution (LTE) technology supports two types of duplex modes that are frequency division duplex (FDD) and time division duplex (TDD).

FIG. 1 schematically illustrates a structure of a frame under time division duplex (TDD) mode of LTE.

As shown in FIG. 1, the frame structure of LTE communication system is illustrated in this embodiment by taking TDD of LTE as an example. In FIG. 1, the length of each radio frame 105 is 10 milliseconds (ms), which is divided equally into two half-frames each having a length of 5 ms. Each half-frame (or semi-frame) 110 comprises five subframes (also referred to as SFs) each having a length of 1 ms, and one of the five subframes is a special subframe 115. The special subframe 115 comprises 3 special parts which are downlink pilot time slot (DwPTS) 120, guard period (GP) 125 and uplink pilot time slot (UpPTS) 130 respectively. Each of the subframes other than the special subframe comprises 2 time slots each having a length of 0.5 ms. Each of the radio subframes other than the special subframe can be allocated to either uplink (from user equipment to base station) or downlink (from base station to user equipment) transmission. The subframe allocated to uplink transmission may be referred to as uplink subframe, and the subframe allocated to downlink transmission may be referred to as downlink subframe.

Figure 2:
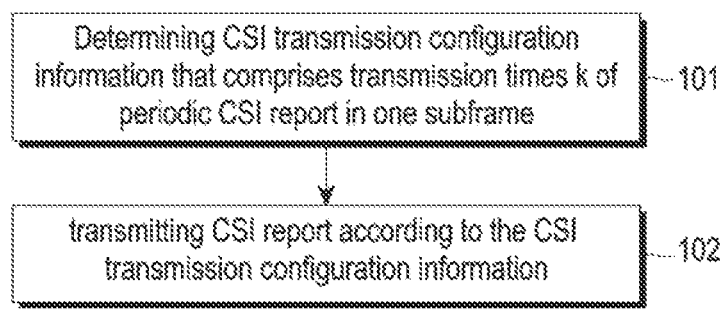
FIG. 2 is a flow chart illustrating a method for transmitting channel state information according to an exemplary embodiment of the present disclosure.

FIG. 2 is a flow chart illustrating a method for transmitting channel state information according to an exemplary embodiment of the present disclosure.

As shown in FIG. 2, the method for transmitting channel state information (CSI) report according to an exemplary embodiment comprises the steps of:

Step 101, determining CSI transmission configuration information that comprises transmission times k of a periodic CSI report in one subframe; and Step 102, transmitting a CSI report according to the CSI transmission configuration information.

In step 101, the UE determines a cell for transmitting uplink control information (UCI), and then determines the CSI transmission configuration information according to the cell for transmitting the UCI. The UCI comprises the CSI report, hybrid automatic retransmission request-acknowledgement (HARQ-ACK), scheduling request (SR) and the like.

Specifically, the UE receives a higher layer signaling such as a radio resource control (RRC) layer signaling to determine the cell (i.e., an assistant cell configured by a base station) for transmitting UCI, and transmits UCI in the cell. If UE fails to receive the cell indicated by the RRC layer signaling, it transmits UCI in a main cell where it is located currently. The UE determines CSI transmission configuration information by receiving information transmitted by the base station of the cell.

For non-periodic CSI report, UE receives CSI request information transmitted by a base station of the cell where it is located currently from downlink control information (DCI) used by the base station to schedule a PUSCH, and transmits the non-periodic CSI report to a base station of a cell according to an indication from the CSI request information.

For periodic CSI report, CSI transmission configuration information comprises transmission times k of the periodic CSI report in one subframe (because UE transmits periodic CSI report on a PUCCH, the transmission times k of the periodic CSI report in one subframe is equal to the transmission times of the PUCCH in one subframe), and comprises one or more of a time offset $N_{OFFSET1}$ of CSI report time domain position relative to a first reference point, a time unit $U_{OFFSET1}$ of $N_{OFFSET1}$, a transmission period $N_p$ of the periodic CSI report, a time unit $U_p$ of $N_p$, a time offset $N_{CQI\_ref}$ of CSI report time domain position relative to a time domain position of corresponding CSI reference resource (also referred to as CSI RR), a time unit $U_{CQI\_ref}$ of $N_{CQI\_ref}$, and a time unit U of time correspondence between CSI reference resource and CSI report. $N_{OFFSET1}$ is an integral multiple of $U_{OFFSET1}$, $N_p$ is an integral multiple of $U_p$, and $N_{CQI\_ref}$ is an integral multiple of $U_{CQI\_ref}$. $U_p$ may be a length of a subframe, a length of a time slot or a length of an orthogonal frequency division multiplexing (OFDM) symbol.

The UE determines the transmission times k of periodic CSI report in one subframe according to one or more of an indication from a received RRC layer signaling, an indication from a media access control (MAC) layer signaling, an indication from system information, a predefined rule in a protocol, and an attribute of resource for transmitting PUCCH. For example, the attribute of resource for transmitting PUCCH may be a space size of a subcarrier for transmitting a PUCCH, and UE may determine the transmission times k of periodic CSI report in one subframe according to the space size of the subcarrier for transmitting the PUCCH.

The UE determines the time offset $N_{OFFSET1}$ of the time-domain position of CSI report relative to the first reference point, the time unit $U_{OFFSET1}$ of $N_{OFFSET1}$, the transmission period $N_p$ of periodic CSI report or the time unit $U_p$ of $N_p$ according to one of the indication from the received RRC layer signaling, the indication from the received MAC layer signaling, the indication from the received system information, the predefined rule in the protocol, and the transmission times k of periodic CSI report in one subframe.

The UE determines the time offset $N_{CQI\_ref}$ of the time-domain position of CSI report relative to the time-domain position of corresponding CSI report according to one of the indication from the received RRC layer signaling, the indication from the received MAC layer signaling, the indication from the received physical layer signaling, the indication from the received system information, the predefined rule in the protocol, the attribute of resource for transmitting PUCCH and the attribute of CSI reference resource. The attribute of CSI reference resource comprises the space size of the subcarrier for transmitting CSI reference resource and/or the time unit $U_{CQI\_ref}$ of $N_{CQI\_ref}$. $N_{CQI\_ref}$ is an integral multiple of $U_{CQI\_ref}$.

The UE determines the time unit U of time correspondence between CSI reference resource and CSI report according to one of the indication from the received RRC layer signaling, the indication from the received MAC layer signaling, the indication from the received physical layer signaling, the indication from the received system information, the predefined rule in the protocol, as well as respective values of $U_{OFFSET1}$, $U_p$ and $U_{CQI\_ref}$. UE determines the time unit U of time correspondence between CSI reference resource and CSI report according to respective values of $U_{OFFSET1}$, $U_P$ and $U_{CQI\_ref}$ comprises determining U to be equal to one of $U_{OFFSET1}$, $U_p$, $U_{CQI\_ref}$, a maximum among $U_{OFFSET1}$, $U_p$ and $U_{CQI\_ref}$, and a minimum among $U_{OFFSET1}$, $U_p$ and $U_{CQI\_ref}$.

As described above, the CSI report is transmitted according to the CSI transmission configuration information in step 102.

The UE finds the CSI reference resource according to a time-frequency position indicated by CSI transmission configuration information, measures the channel state information-reference signal (CSI-RS) in CSI reference resource, and feedbacks the reported CSI back to base station according to measure results.

The UE finds a corresponding PUCCH or PUSCH according to the time-frequency position indicated by CSI transmission configuration information, and transmits the periodic CSI report to base station on the PUCCH or PUSCH. UE finds a corresponding PUSCH according to the time-frequency position indicated by CSI transmission configuration information (CSI request information in DCI for scheduling PUSCH), and transmits non-periodic CSI report to the base station on the PUSCH.

The PUCCH of a cell for transmitting CSI report can be transmitted once in a subframe (1 ms), once in a time slot (a length of the time slot varies with the space size of subcarrier), or once in a micro time slot (a micro time slot comprises several OFDM symbols). The transmission times of the PUCCH in one subframe are equal to the transmission times of periodic CSI report in one subframe.

Some exemplary embodiments are provided hereinafter to illustrate how UE transmits CSI report according to CSI transmission configuration information.

Exemplary Embodiment 1

How the transmission period $N_p$ of periodic CSI report and the time unit $U_p$ of $N_p$ are determined will be described in this exemplary embodiment.

In this exemplary embodiment, $U_p$ is equal to a predefined time length, for example, a time length (1 ms) of a subframe. In this situation, $N_p$ has a minimum of 1 ms.

When the transmission times of a PUCCH in one subframe is k=1, UE transmits the PUCCH only once in a subframe of 1 ms. $U_{OFFSET1}$ is the time length of a subframe and the position of the PUCCH in the subframe is undefined. UE can transmit the PUCCH in the whole subframe, or transmits the PUCCH in a predefined time interval in the subframe. For example, UE may transmit the PUCCH in one or more OFDM symbols in a later part of the subframe. For the TDD, the CSI report configuration shown in table 1 can be adopted. For the FDD, the CSI report configuration shown in table 2 can be adopted, or a configuration in which some values of $N_p$ (for example, the value of $N_p$ being 1 ms) are added to Table 2 can be adopted.

TABLE 1

| cqi − pmi − ConfigIndex = $I_{CQI/PMI}$ | Value of $N_p$ | Value of $N_{OFFSET1}$ |
|---|---|---|
| $I_{CQI/PMI} = 0$ | 1 | $I_{CQI/PMI}$ |
| $1 \leq I_{CQI/PMI} \leq 5$ | 5 | $I_{CQI/PMI} - 1$ |
| $6 \leq I_{CQI/PMI} \leq 15$ | 10 | $I_{CQI/PMI} - 6$ |
| $16 \leq I_{CQI/PMI} \leq 35$ | 20 | $I_{CQI/PMI} - 16$ |
| $36 \leq I_{CQI/PMI} \leq 75$ | 40 | $I_{CQI/PMI} - 36$ |
| $76 \leq I_{CQI/PMI} \leq 155$ | 80 | $I_{CQI/PMI} - 76$ |
| $156 \leq I_{CQI/PMI} \leq 315$ | 160 | $I_{CQI/PMI} - 156$ |
| $316 \leq I_{CQI/PMI} \leq 1023$ | | Reserved |

TABLE 2

| cqi − pmi − ConfigIndex = $I_{CQI/PMI}$ | Value of $N_p$ | Value of $N_{OFFSET1}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI} - 2$ |
| $7 \leq I_{CQI/PMI} \leq 16$ | 10 | $I_{CQI/PMI} - 7$ |
| $17 \leq I_{CQI/PMI} \leq 36$ | 20 | $I_{CQI/PMI} - 17$ |
| $37 \leq I_{CQI/PMI} \leq 76$ | 40 | $I_{CQI/PMI} - 37$ |
| $77 \leq I_{CQI/PMI} \leq 156$ | 80 | $I_{CQI/PMI} - 77$ |
| $157 \leq I_{CQI/PMI} \leq 316$ | 160 | $I_{CQI/PMI} - 157$ |
| $I_{CQI/PMI} = 317$ | | Reserved |
| $318 \leq I_{CQI/PMI} \leq 349$ | 32 | $I_{CQI/PMI} - 318$ |
| $350 \leq I_{CQI/PMI} \leq 413$ | 64 | $I_{CQI/PMI} - 350$ |
| $414 \leq I_{CQI/PMI} \leq 541$ | 128 | $I_{CQI/PMI} - 414$ |
| $542 \leq I_{CQI/PMI} \leq 1023$ | | Reserved |

When the transmission times of the PUCCH in one subframe is k=N (N is a positive integer larger than 1), UE transmits the PUCCH N times in a subframe of 1 ms. For example, when the space size of a subcarrier is 15 kHz, UE transits the PUCCH 2 times (N=2) in one subframe, that is, $U_p$ is the time length (0.5 ms) of a time slot. Alternatively, when the space size of the subcarrier is 60 kHz, UE transmits the PUCCH 4 times (N=4) in one subframe, that is, $U_p$ is the time length (0.25 ms) of half of the time slot. In this way, the periodic CSI report can be transmitted in a plurality of positions in one subframe. When determining the time domain position of CSI report, the position of the subframe for transmitting the PUCCH can be determined firstly by using the time offset $N_{OFFSET1}$ of the time domain position of CSI report relative to a first reference point ($U_{OFFSET1}$ is the time length of one subframe), and then the time domain position at which PUCCH is transmitted in the subframe can be determined by using the time offset $N_{OFFSET2}$ of the time domain position of CSI report relative to a second reference point (the second reference point is the subframe header of the subframe determined by $N_{OFFSET1}$ and the time unit $U_{OFFSET2}$ of $N_{OFFSET2}$ is the length of the time slot). As shown in an TDD CSI report configuration of table 3, PUCCH is transmitted 2 times in one subframe, wherein mod is a modulus operation, and CSI report is transmitted in the subframe and time offset $N_{OFFSET2}$ which satisfy the condition of $(10 \times n_f + n_{subframe} - N_{OFFSET1}) \bmod N_p = 0 \cdot n_f$ is a radio frame number and $n_{subframe}$ is a subframe number.

TABLE 3

| cqi − pmi − ConfigIndex = $I_{CQI/PMI}$ | Value of $N_p$ | Value of $N_{OFFSET1}$ | Value of $N_{OFFSET2}$ |
|---|---|---|---|
| $0 \leq I_{CQI/PMI} \leq 1$ | 1 | Floor ($I_{CQI/PMI}/2$) | $I_{CQI/PMI} \bmod 2$ |
| $2 \leq I_{CQI/PMI} \leq 11$ | 5 | Floor (($I_{CQI/PMI} - 2)/2$) | $I_{CQI/PMI} \bmod 2$ |
| $12 \leq I_{CQI/PMI} \leq 31$ | 10 | Floor (($I_{CQI/PMI} - 12)/2$) | $I_{CQI/PMI} \bmod 2$ |
| $32 \leq I_{CQI/PMI} \leq 71$ | 20 | Floor (($I_{CQI/PMI} - 32)/2$) | $I_{CQI/PMI} \bmod 2$ |
| $72 \leq I_{CQI/PMI} \leq 151$ | 40 | Floor (($I_{CQI/PMI} - 72)/2$) | $I_{CQI/PMI} \bmod 2$ |
| $152 \leq I_{CQI/PMI} \leq 311$ | 80 | Floor (($I_{CQI/PMI} - 152)/2$) | $I_{CQI/PMI} \bmod 2$ |
| $312 \leq I_{CQI/PMI} \leq 631$ | 160 | Floor (($I_{CQI/PMI} - 312)/2$) | $I_{CQI/PMI} \bmod 2$ |
| $632 \leq I_{CQI/PMI} \leq 1023$ | | Reserved | |

When determining the time domain position of CSI report, the position of the subframe for transmitting PUCCH can be determined only by using the time offset $N_{OFFSET1}$ of the time domain position of CSI report relative to the first reference point. As shown in an TDD CSI report configuration of Table 4, PUCCH is transmitted 2 times in one subframe, and CSI report is transmitted in the time slot that satisfies the condition of $(10 \times n_f + n_{slot} - N_{OFFSET1}) \bmod (2*N_p) = 0 \cdot n_f$ is a radio frame number, and $n_{slot}$ is a subframe number. The above description is provided by taking TDD as an example. As for FDD, the transmission period $N_p$ of periodic CSI report and the time offset $N_{OFFSET1}$ of the time domain position of CSI report relative to the first reference point may be configured in a same way.

TABLE 4

| cqi − pmi − ConfigIndex = $I_{CQI/PMI}$ | Value of $N_p$ | Value of $N_{OFFSET1}$ |
|---|---|---|
| $0 \leq I_{CQI/PMI} \leq 1$ | 1 | $I_{CQI/PMI}$ |
| $2 \leq I_{CQI/PMI} \leq 11$ | 5 | $I_{CQI/PMI} - 2$ |
| $12 \leq I_{CQI/PMI} \leq 31$ | 10 | $I_{CQI/PMI} - 12$ |
| $32 \leq I_{CQI/PMI} \leq 71$ | 20 | $I_{CQI/PMI} - 32$ |
| $72 \leq I_{CQI/PMI} \leq 151$ | 40 | $I_{CQI/PMI} - 72$ |
| $152 \leq I_{CQI/PMI} \leq 311$ | 80 | $I_{CQI/PMI} - 152$ |
| $312 \leq I_{CQI/PMI} \leq 631$ | 160 | $I_{CQI/PMI} - 312$ |
| $632 \leq I_{CQI/PMI} \leq 1023$ | | Reserved |

Exemplary Embodiment 2

How the transmission period $N_p$ of periodic CSI report and the time unit $U_p$ of $N_p$ are determined will be described in this exemplary embodiment.

Figure 3:
FIG. 3 schematically illustrates a corresponding relationship between periodic CSI report and CSI reference resource in an exemplary embodiment 2.

FIG. 3 schematically illustrates a corresponding relationship between periodic CSI report and CSI reference resource in an exemplary embodiment 2.

In this exemplary embodiment, $N_p$ and $U_p$ are configured by the RRC layer signaling, indicated by system information, or predefined by a protocol. $U_p$ can also be determined by a time interval at which PUCCH is transmitted in the cell for transmitting periodic CSI report, or determined by the transmission times k in one subframe of PUCCH in the cell for transmitting periodic CSI report. For example, if the transmission times k=M (M is a positive integer) in one subframe for a PUCCH and UE transmits the PUCCH M times in a subframe of 1 ms such as 310, the time unit $U_p$ of the transmission period $N_p$ of periodic CSI report is 1/M ms, as can be seen in FIG. 3. The time unit $U_p$ of the transmission period $N_p$ of periodic CSI report can be configured as a length of a time slot or a length of a micro time slot (a micro time slot comprises several OFDM symbols).

In this exemplary embodiment, the time unit $U_{OFFSET1}$ of the time offset $N_{OFFSET1}$ of the time domain position of CSI report relative to the first reference point is same as the time unit $U_p$ of the transmission period $N_p$ of periodic CSI report. The values of $U_{OFFSET1}$ and $U_p$ are both denoted as $T_p$, which will be referred to as time slot hereinafter in the present exemplary embodiment. For example, the periodic CSI report can be configured as shown in Table 5 in the cell for transmitting periodic CSI report. The CSI report is transmitted in the time slot(s) that satisfies the condition of $(10 \times n_f + n_{unit} - N_{OFFSET1}) \bmod N_p = 0$, wherein $n_f$ is a radio frame number and $n_{unit}$ is the sequence number(s) of time slot(s) with a time unit of $T_p$ in a radio frame. The above description is provided by taking TDD as an example. As for FDD, the transmission period $N_p$ of periodic CSI report and the time offset $N_{OFFSET1}$ of the time domain position of CSI report relative to the first reference point may be configured in a same way.

TABLE 5

| cqi – pmi – ConfigIndex = $I_{CQI/PMI}$ | Value of $N_P$ (with time unit of $T_p$) | Value of $N_{OFFSET1}$ (with time unit of $T_p$) |
|---|---|---|
| 0 ≤ $I_{CQI/PMI}$ ≤ 1 | 2 | $I_{CQI/PMI}$ |
| 2 ≤ $I_{CQI/PMI}$ ≤ 11 | 10 | $I_{CQI/PMI}$ – 2 |
| 12 ≤ $I_{CQI/PMI}$ ≤ 31 | 20 | $I_{CQI/PMI}$ – 12 |
| 32 ≤ $I_{CQI/PMI}$ ≤ 71 | 40 | $I_{CQI/PMI}$ – 32 |
| 72 ≤ $I_{CQI/PMI}$ ≤ 151 | 80 | $I_{CQI/PMI}$ – 72 |
| 152 ≤ $I_{CQI/PMI}$ ≤ 311 | 160 | $I_{CQI/PMI}$ – 152 |
| 312 ≤ $I_{CQI/PMI}$ ≤ 631 | 320 | $I_{CQI/PMI}$ – 312 |
| 632 ≤ $I_{CQI/PMI}$ ≤ 1023 | Reserved | |

Exemplary Embodiment 3

How to determine the corresponding relationship between the periodic CSI report and the CSI reference resource will be described in this exemplary embodiment.

Figure 4:
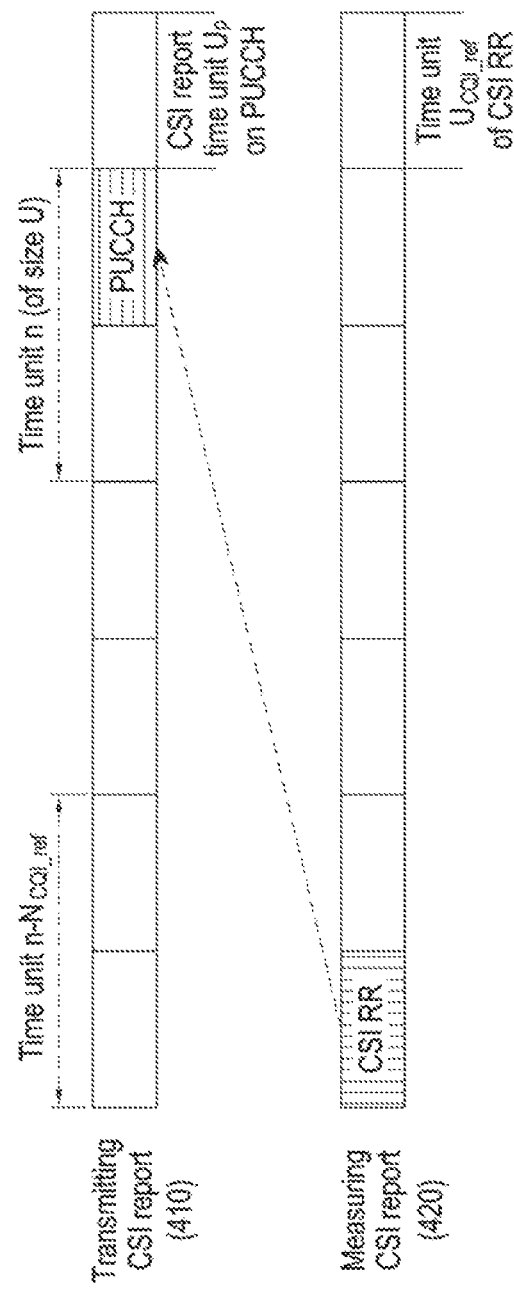
FIG. 4 schematically illustrates a corresponding relationship between periodic CSI report and CSI reference resource in an exemplary embodiment 3.

FIG. 4 schematically illustrates a corresponding relationship between periodic CSI report and CSI reference resource in an exemplary embodiment 3.

As for periodic CSI report, a periodic CSI report of a cell may be transmitted in this cell. In this situation, the time unit $U_p$ of the transmission period $N_p$ of the periodic CSI report, the time unit $U_{OFFSET1}$ of the time offset $N_{OFFSET1}$ of the CSI report time domain position relative to the first reference point and the time unit $U_{CQI\_ref}$ of the time offset $N_{CQI\_ref}$ of the CSI report time domain position relative to the time domain position of CSI reference resource may be same. However, because different space sizes of sub-carriers are adopted in uplink transmission and downlink transmission respectively, $U_p$, $U_{OFFSET1}$ and $U_{CQI\_ref}$ may be different. In this exemplary embodiment, a situation in which $U_p$, $U_{OFFSET1}$ and $U_{CQI\_ref}$ are equal to each other, i.e., $U_p = U_{OFFSET1} = U_{CQI\_ref}$ is described. This exemplary embodiment comprises the following two cases I and II in view that the time unit U of time correspondence between CSI reference resource and CSI report has different values.

Case I: U is equal to $U_p$, $U_{OFFSET1}$ and $U_{CQI\_ref}$, i.e., $U = U_p = U_{OFFSET1} = U_{CQI\_ref}$.

U, $U_p$, $U_{OFFSET1}$ and $U_{CQI\_ref}$ can be equal to a subframe, a time slot, or a micro time slot.

In the time domain, if, in a cell, UE reports CSI report during the time unit n and configures transmission modes 1-9 or configures transmission mode 10 but configures only one CSI report process, the CSI reference resource is in a time unit $n - N_{CQI\_ref}$. The time unit $n - N_{CQI\_ref}$ is an effective downlink time unit or a special time unit. $N_{CQI\_ref}$ satisfies a condition of $N_{CQI\_ref} \geq L1$. L1 is a positive integer and may be configured by the RRC layer signaling, determined by the indication from the MAC layer signaling, determined by the indication from the physical layer signaling, indicated by the system information, predefined by a protocol, or determined by the space size of the subcarrier of the PUCCH for transmitting periodic CSI report. Alternatively, L1 may be determined by the attribute of CSI reference resource, for example, the space size of subcarrier of CSI reference resource or $U_{CQI\_ref}$.

In the time domain, if, in a cell, UE reports CSI report in time unit n and configures transmission mode 10 and a plurality of CSI report processes, CSI reference resource of each CSI report process is in a time unit $n - N_{CQI\_ref}$. The time unit $n - N_{CQI\_ref}$ is an effective downlink time unit or a special time unit. For FDD, $N_{CQI\_ref}$ satisfies a condition of $N_{CQI\_ref} \geq L2$. L2 is a positive integer and may be configured by the RRC layer signaling, determined by the indication from the MAC layer signaling, determined by the indication from the physical layer signaling, indicated by the system information, predefined by a protocol, or determined by the space size of the subcarrier of the PUCCH for transmitting periodic CSI report. Alternatively, L2 may be determined by the attribute of CSI reference resource, for example, the space size of the subcarrier of CSI reference resource or $U_{CQI\_ref}$. For TDD, if UE configures 2 or 3 CSI report processes, $N_{CQI\_ref}$ satisfies a condition of $N_{CQI\_ref} \geq L1$. For TDD, if UE configures 4 CSI report processes, $N_{CQI\_ref}$ satisfies a condition of $N_{CQI\_ref} \geq L2$.

Case II: U is not equal to either of $U_p$, $U_{OFFSET1}$ and $U_{CQI\_ref}$, which will be described by taking $U \neq U_p = U_{OFFSET1} = U_{CQI\_ref}$ as an example.

U may be equal to a time length of a subframe, a time slot, or a micro time slot. Specifically, U may be configured by the RRC layer signaling, determined by the indication from the MAC layer signaling, determined by the indication from the physical layer signaling, indicated by the system information, or predefined by a protocol. For example, U is equal to the time period (1 ms) of a subframe.

In the time domain, if, in a cell, UE reports CSI report on a PUCCH or a PUSCH in a time unit n, the PUCCH or the PUSCH may be transmitted throughout the time unit n or only during a part of the time unit n. If UE configures transmission modes 1-9 or configures transmission mode 10 but only one CSI report process, the CSI reference resource is in the time unit $n - N_{CQI\_ref}$. In this situation, the CSI reference resource may be transmitted throughout the time unit $n - N_{CQI\_ref}$ or during a part of the time unit $n - N_{CQI\_ref}$ For example, as shown in FIG. 4, PUCCH for transmitting periodic CSI report 410 is transmitted during a later part of time unit n, and the CSI reference resource 420 is transmitted during an earlier part of time unit n-$N_{CQI\_ref}$. The time unit n-$N_{CQI\_ref}$ is an effective downlink time unit or a special time unit. $N_{CQI\_ref}$ satisfies a condition of $N_{CQI\_ref} \geq S1$. S1 is a positive integer and may be configured by an RRC layer signaling, determined by an indication from a MAC layer signaling, determined by an indication from a physical layer signaling, indicated by system information, predefined by a protocol or determined by a space size of a subcarrier for PUCCH for transmitting periodic CSI report. Alternatively, S1 may be determined by the attribute of CSI reference resource, for example, the space size of the subcarrier for CSI reference resource or $U_{CQI\_ref}$.

In the time domain, if, in a cell, UE reports CSI report on a PUCCH or a PUSCH during the time unit n, at this time, the PUCCH or the PUSCH may be transmitted throughout the time unit n or only during a part of the time unit n. If UE configures transmission mode 10 and a plurality of CSI report processes, CSI reference resource of each CSI report process is in time unit n-$N_{CQI\_ref}$. In this situation, CSI reference resource nay be transmitted throughout the time unit n-$N_{CQI\_ref}$ or during a part of the time unit n-$N_{CQI\_ref}$. For example, as shown in FIG. 4, the PUCCH for transmitting periodic CSI report 410 is transmitted during a later part of time unit n, and the CSI reference resource 420 is transmitted during an earlier part of the time unit n-$N_{CQI\_ref}$. The time unit n-$N_{CQI\_ref}$ is an effective downlink time unit or a special time unit. For FDD, $N_{CQI\_ref}$ satisfies a condition of $N_{CQI\_ref} \geq S2$. S2 is a positive integer and may be configured by a RRC layer signaling, determined by an indication from a MAC layer signaling, determined by an indication from a physical layer signaling, indicated by system information, predefined by a protocol, or determined by the space size of the subcarrier for the PUCCH for transmitting periodic CSI report. Alternatively, S2 may be determined by the attribute of CSI reference resource, for example, the space size of the subcarrier of CSI reference resource or $U_{CQI\_ref}$. For TDD, if UE configures 2 or 3 CSI report processes, $N_{CQI\_ref}$ satisfies the condition of $N_{CQI\_ref} \geq S1$. For TDD, if UE configures 4 CSI report processes, $N_{CQI\_ref}$ satisfies the condition of $N_{CQI\_ref} \geq S2$.

Exemplary Embodiment 4

How to determine the corresponding relationship between periodic CSI report and CSI reference resource will be described in this embodiment.

FIGS. 5 to 11 schematically illustrate corresponding relationships between periodic CSI report and CSI reference resource in an exemplary embodiment 4 respectively.

In this exemplary embodiment, a case in which $U_{CQI\_ref}$ and $U_p$ are not equal to $U_{OFFSET1}$, i.e., $U_p = U_{OFFSET1} \neq U_{CQI\_ref}$ is described. This exemplary embodiment comprises the followings situations I to V in view that the time unit U of time correspondence between CSI reference resource and CSI report has different values.

I: U is specified by a base station and irrelevant $U_p$, $U_{OFFSET1}$, $U_{CQI\_ref}$.

U may be equal to a time period of a subframe, a time slot, or a micro time slot. Specifically, U may be configured by a RRC layer signaling, determined by an indication from a MAC layer signaling, determined by an indication from a physical layer signaling, indicated by system information or predefined by a protocol. For example, U is equal to a time period (1 ms) of a subframe.

Figure 5:
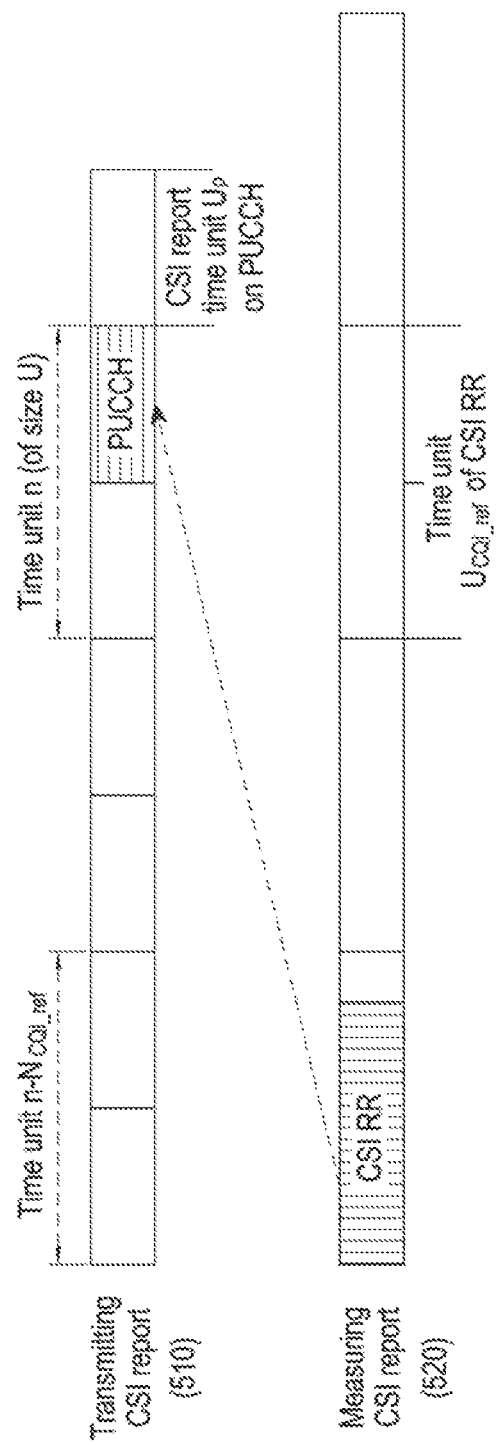
FIG. 5 schematically illustrates a corresponding relationship between periodic CSI report and CSI reference resource in an exemplary embodiment 4.

In time domain, if, in a cell, UE reports CSI report in a PUCCH or a PUSCH in a time unit n, the PUCCH or the PUSCH may be transmitted throughout the time unit n or during a part of the time unit n. If UE configures transmission modes 1-9 or configures transmission mode 10 but only one CSI report process, the CSI reference resource is in the time unit n-$N_{CQI\_ref}$. In this situation, the CSI reference resource may be transmitted throughout the time unit n-$N_{CQI\_ref}$ or during a part of the time unit n-$N_{CQI\_ref}$. For example, as shown in FIG. 5, the PUCCH for transmitting periodic CSI report 510 may be transmitted during a later part of the time unit n, and the CSI reference resource 520 may be transmitted during the time unit n-$N_{CQI\_ref}$. The time unit n-$N_{CQI\_ref}$ is an effective downlink time unit or a special time unit. $N_{CQI\_ref}$ satisfies the condition of $N_{CQI\_ref} \geq S1$.

In time domain, if, in a cell, UE reports CSI report on a PUCCH or a PUSCH in a time unit n, the PUCCH or the PUSCH may be transmitted throughout the time unit n during a part of the time unit n. If UE configures transmission mode 10 and a plurality of CSI report processes, CSI reference resource of each CSI report process is in the time unit n-$N_{CQI\_ref}$. In such a situation, the CSI reference resource may be transmitted throughout the time unit n-$N_{CQI\_ref}$ or during a part of the time unit n-$N_{CQI\_ref}$. For example, as shown in FIG. 5, the PUCCH for transmitting periodic CSI report 510 is transmitted during the time unit n, and the CSI reference resource 520 is transmitted during the time unit n-$N_{CQI\_ref}$. The time unit n-$N_{CQI\_ref}$ is an effective downlink time unit or a special time unit. For FDD, $N_{CQI\_ref}$ satisfies the condition of $N_{CQI\_ref} \geq S2$. For TDD, if UE configures 2 or 3 CSI report processes, $N_{CQI\_ref}$ satisfies the condition of $N_{CQI\_ref} \geq S1$. For TDD, if UE configures 4 CSI report processes, $N_{CQI\_ref}$ satisfies the condition of $N_{CQI\_ref} \geq S2$.

II: U is equal to $U_p$ and $U_{OFFSET1}$, i.e., $U = U_p = U_{OFFSET1}$.

1. $U_{CQI\_ref} \leq U_p$

Figure 6:
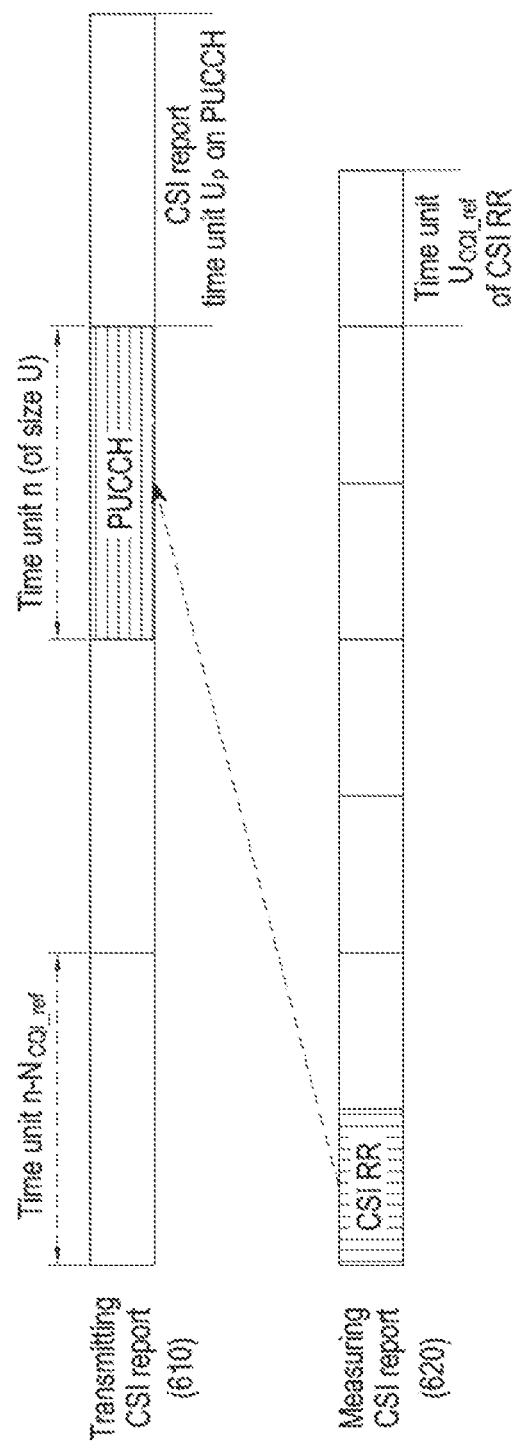
FIG. 6 schematically illustrates a corresponding relationship between periodic CSI report and CSI reference resource in the exemplary embodiment 4.

In the time domain, if, in a cell, UE reports CSI report on a PUCCH or a PUSCH in a time unit n and configures transmission modes 1-9 or configures transmission mode 10 but only one CSI report process, the CSI reference resource is in the time unit n-$N_{CQI\_ref}$. In this situation, the CSI reference resource may be transmitted throughout the time unit n-$N_{CQI\_ref}$ or during a part of the time unit n-$N_{CQI\_ref}$. For example, as shown in FIG. 6, the PUCCH for transmitting periodic CSI report 610 is transmitted during time unit n, and the CSI reference resource 620 is transmitted during an earlier part of the time unit n-$N_{CQI\_ref}$. The time unit n-$N_{CQI\_ref}$ is an effective downlink time unit or a special time unit. $N_{CQI\_ref}$ satisfies the condition of $N_{CQI\_ref} \geq S1$.

In the time domain, if, in a cell, UE reports CSI report on a PUCCH or a PUSCH in a time unit n and configures transmission mode 10 and a plurality of CSI report processes, CSI reference resource of each CSI report process is in the time unit n-$N_{CQI\_ref}$. In such a situation, the CSI reference resource may be transmitted throughout the time unit n-$N_{CQI\_ref}$ or during a part of the time unit n-$N_{CQI\_ref}$. For example, as shown in FIG. 6, the PUCCH for transmitting periodic CSI report 610 is transmitted during the time unit n, and the CSI reference resource 620 is transmitted during an earlier part of the time unit n-$N_{CQI\_ref}$. The time unit n-$N_{CQI\_ref}$ is an effective downlink time unit or a special time unit. For FDD, $N_{CQI\_ref}$ satisfies the condition of $N_{CQI\_ref} \geq S2$. For TDD, if UE configures 2 or 3 CSI report processes, $N_{CQI\_ref}$ satisfies the condition of $N_{CQI\_ref} \geq S1$. For TDD, if UE configures 4 CSI report processes, $N_{CQI\_ref}$ satisfies the condition of $N_{CQI\_ref} \geq S2$.

2. $U_{CQI\_ref} > U_p$

Figure 7:
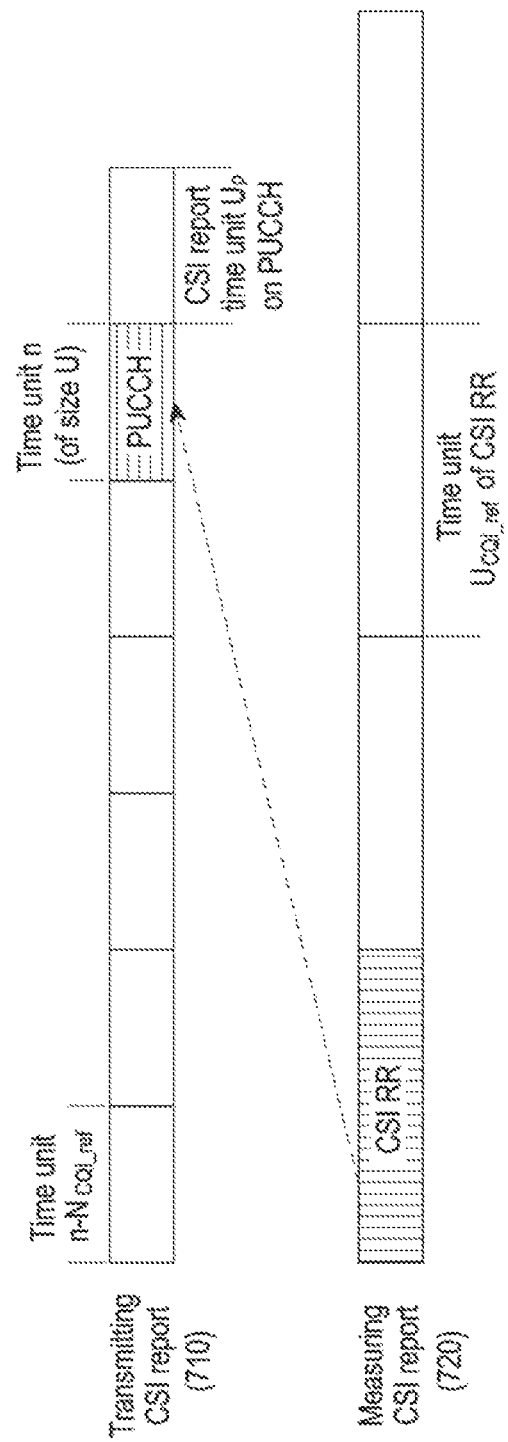
FIG. 7 schematically illustrates a corresponding relationship between periodic CSI report and CSI reference resource in the exemplary embodiment 4.

In the time domain, if, in a cell, UE reports CSI report on a PUCCH or a PUSCH during a time unit n and configures transmission modes 1-9 or configures transmission mode 10 but only one CSI report process, the CSI reference resource is in the time unit $n-N_{CQI\_ref}$. In such a situation, all or some of the CSI reference resource may be transmitted during the time unit $n-N_{CQI\_ref}$. For example, as shown in FIG. 7, the PUCCH for transmitting periodic CSI report 710 is transmitted during the time unit n, and a preceding part of CSI reference resource 720 is transmitted during the time unit $n-N_{CQI\_ref}$. The time unit $n-N_{CQI\_ref}$ is an effective downlink time unit or a special time unit. $N_{CQI\_ref}$ satisfies the condition of $N_{CQI\_ref} \geq S1$.

In the time domain, if, in a cell, UE reports CSI report on a PUCCH or a PUSCH during a time unit n and configures transmission mode 10 and a plurality of CSI report process, the CSI reference resource of each CSI report process is in the time unit $n-N_{CQI\_ref}$. In such a situation, all or some of the CSI reference resource may be transmitted during the time unit $n-N_{CQI\_ref}$. For example, as shown in FIG. 7, the PUCCH for transmitting periodic CSI report 710 is transmitted during the time unit n, and a preceding part of CSI reference resource 720 is transmitted during the time unit $n-N_{CQI\_ref}$. The time unit $n-N_{CQI\_ref}$ is an effective downlink time unit or a special time unit. For FDD, $N_{CQI\_ref}$ satisfies the condition of $N_{CQI\_ref} \geq S2$. For TDD, if UE configures 2 or 3 CSI report processes, $N_{CQI\_ref}$ satisfies the condition of $N_{CQI\_ref} \geq S1$. For TDD, when UE configures 4 CSI report processes, $N_{CQI\_ref}$ satisfies the condition of $N_{CQI\_ref} \geq S2$.

III: U is equal to $U_{CQI\_ref}$, i.e., $U=U_{CQI\_ref}$.

1. $U_{CQI\_ref} \leq S2$.

Figure 8:
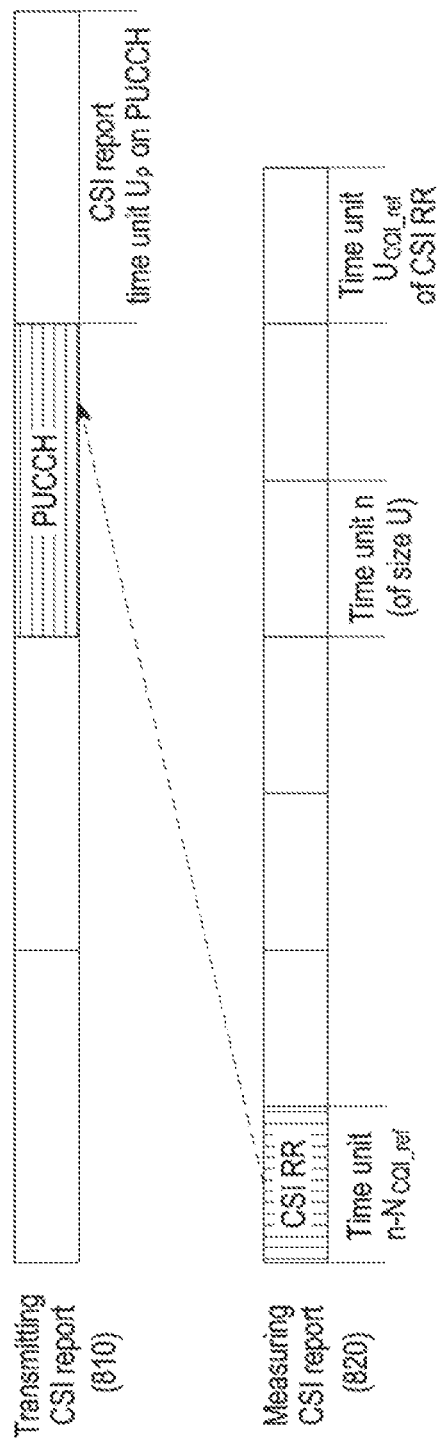
FIG. 8 schematically illustrates a corresponding relationship between periodic CSI report and CSI reference resource in the exemplary embodiment 4.

In the time domain, if, in a cell, UE reports CSI report on a PUCCH(s) or a PUSCH(s) in a time unit n, all or some of the PUCCH(s) or PUSCH(s) may be transmitted during the time unit n. If UE configures transmission modes 1-9 or configures transmission mode 10 but only one CSI report process, the CSI reference resource is in the time unit $n-N_{CQI\_ref}$. For example, as shown in FIG. 8, a preceding part of the PUCCH for transmitting periodic CSI report 810 is transmitted during the time unit n, and the CSI reference resource 820 is transmitted during the time unit $n-N_{CQI\_ref}$. The time unit $n-N_{CQI\_ref}$ is an effective downlink time unit or a special time unit. $N_{CQI\_ref}$ satisfies the condition of $N_{CQI\_ref} \geq S1$.

In the time domain, if, in a cell, UE reports CSI report on a PUCCH(s) or a PUSCH(s) during a time unit n, all or some of the PUCCH(s) or PUSCH(s) may be transmitted during the time unit n. UE configures transmission mode 10 and a plurality of CSI report processes, and the CSI reference resource of each CSI report process is in the time unit $n-N_{CQI\_ref}$. For example, as shown in FIG. 8, a preceding part of the PUCCH for transmitting periodic CSI report 810 is transmitted during the time unit n, and CSI reference resource 820 is transmitted during the time unit $n-N_{CQI\_ref}$. The time unit $n-N_{CQI\_ref}$ is an effective downlink time unit or a special time unit. For FDD mode, $N_{CQI\_ref}$ satisfies the condition of $N_{CQI\_ref} \geq S2$. For TDD, if UE configures 2 or 3 CSI report processes, $N_{CQI\_ref}$ satisfies the condition of $N_{CQI\_ref} \geq S1$. For TDD, when UE configures 4 CSI report processes, $N_{CQI\_ref}$ satisfies the condition of $N_{CQI\_ref} \geq S2$.

2. $U_{CQI\_ref} > U_p$

Figure 9:
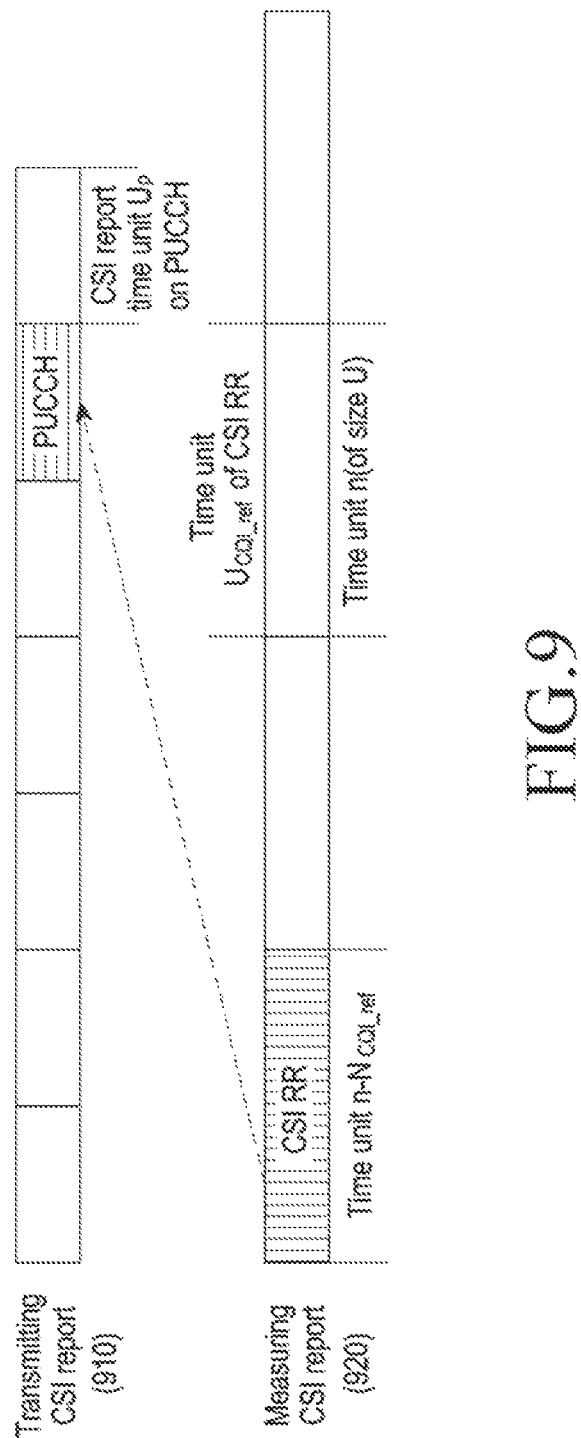
FIG. 9 schematically illustrates a corresponding relationship between periodic CSI report and CSI reference resource in the exemplary embodiment 4.

In the time domain, if, in a cell, UE reports CSI report on a PUCCH or a PUSCH during the time unit n, UE configures transmission modes 1-9 or configures transmission mode 10 but only one CSI report process, the CSI reference resource is in the time unit $n-N_{CQI\_ref}$. In such a situation, all of some of the CSI reference resource may be transmitted during the time unit $n-N_{CQI\_ref}$. For example, as shown in FIG. 9, the PUCCH for transmitting periodic CSI report 910 is transmitted during the time unit n, and a preceding part of CSI reference resource 920 is transmitted during the time unit $n-N_{CQI\_ref}$. The time unit $n-N_{CQI\_ref}$ is an effective downlink time unit or a special time unit. $N_{CQI\_ref}$ satisfies the condition of $N_{CQI\_ref} \geq S1$.

In the time domain, if, in a cell, UE reports CSI report on a PUCCH or a PUSCH in a time unit n and configures transmission mode 10 as well as a plurality of CSI report processes, the CSI reference resource of each CSI report process is in the time unit $n-N_{CQI\_ref}$. In such a situation, all or some of the CSI reference resource may be transmitted during the time unit $n-N_{CQI\_ref}$. For example, as shown in FIG. 9, the PUCCH for transmitting periodic CSI report 910 is transmitted during the time unit n, and a preceding part of CSI reference resource 920 is transmitted during the time unit $n-N_{CQI\_ref}$. The time unit $n-N_{CQI\_ref}$ is an effective downlink time unit or a special time unit. For FDD, $N_{CQI\_ref}$ satisfies the condition of $N_{CQI\_ref} \geq S2$. For TDD, if UE configures 2 or 3 CSI report processes, $N_{CQI\_ref}$ satisfies the condition of $N_{CQI\_ref} \geq S1$. For TDD, when UE configures 4 CSI report processes, $N_{CQI\_ref}$ satisfies the condition of $N_{CQI\_ref} \geq S2$.

IV: U is equal to a maximum among $U_p$, $U_{OFFSET1}$ and $U_{CQI\_ref}$, i.e., $U = \max\{U_{CQI\_ref}, U_p, U_{OFFSET1}\}$.

Figure 10:
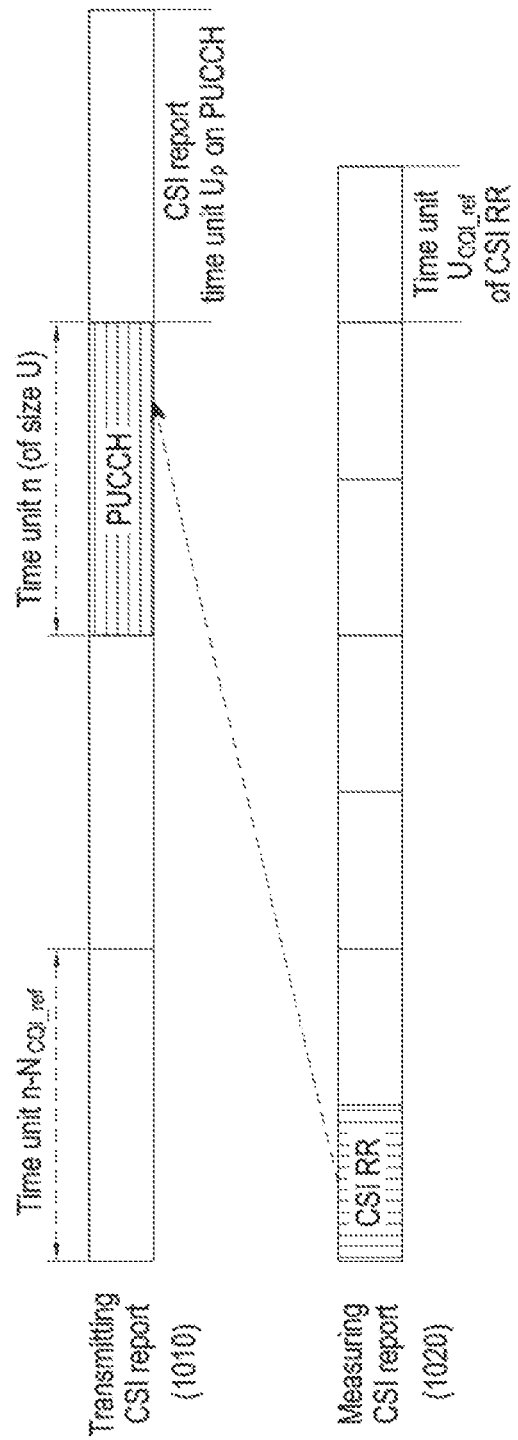
FIG. 10 schematically illustrates a corresponding relationship between periodic CSI report and CSI reference resource in the exemplary embodiment 4.

In the time domain, if, in a cell, UE reports CSI report on a PUCCH or a PUSCH during the time unit n, the PUCCH or the PUSCH may be transmitted throughout the time unit n or during a part of the time unit n. If UE configures transmission modes 1-9 or configures transmission mode 10 but only one CSI report process, the CSI reference resource is in the time unit $n-N_{CQI\_ref}$. The CSI reference resource may be transmitted throughout the time unit $n-N_{CQI\_ref}$ or during a part of the time unit $n-N_{CQI\_ref}$. For example, as shown in FIG. 10, the PUCCH for transmitting periodic CSI report 1010 is transmitted during the time unit n, and the CSI reference resource 1020 is transmitted during an earlier part of the time unit $n-N_{CQI\_ref}$. The time unit $n-N_{CQI\_ref}$ is an effective downlink time unit or a special time unit. $N_{CQI\_ref}$ satisfies the condition of $N_{CQI\_ref} \geq S1$.

In the time domain, if, in a cell, UE reports CSI report on a PUCCH or a PUSCH during time unit n, the PUCCH or the PUSCH may be transmitted throughout the time unit n or during a part of the time unit n. If UE configures transmission mode 10 and a plurality of CSI report processes, CSI reference resource of each CSI report process is in the time unit $n-N_{CQI\_ref}$. In such a situation, CSI reference resource may be transmitted throughout the time unit $n-N_{CQI\_ref}$ or during a part of the time unit $n-N_{CQI\_ref}$. For example, as shown in FIG. 10, the PUCCH for transmitting periodic CSI report 1010 is transmitted during the time unit n, and CSI reference resource 1020 is transmitted during a preceding part of the time unit $n-N_{CQI\_ref}$. The time unit $n-N_{CQI\_ref}$ is an effective downlink time unit or a special time unit. For FDD, $N_{CQI\_ref}$ satisfies the condition of $N_{CQI\_ref} \geq S2$. For TDD, if UE configures 2 or 3 CSI report processes, $N_{CQI\_ref}$ satisfies the condition of $N_{CQI\_ref} \geq S1$. For TDD, if UE configures 4 CSI report processes, $N_{CQI\_ref}$ satisfies the condition of $N_{CQI\_ref}$.

V: U is equal to a minimum among $U_p$, $U_{OFFSET1}$ and $U_{CQI\_ref}$, i.e., $U = \min\{U_{CQI\_ref}, U_p, U_{OFFSET1}\}$.

Figure 11:
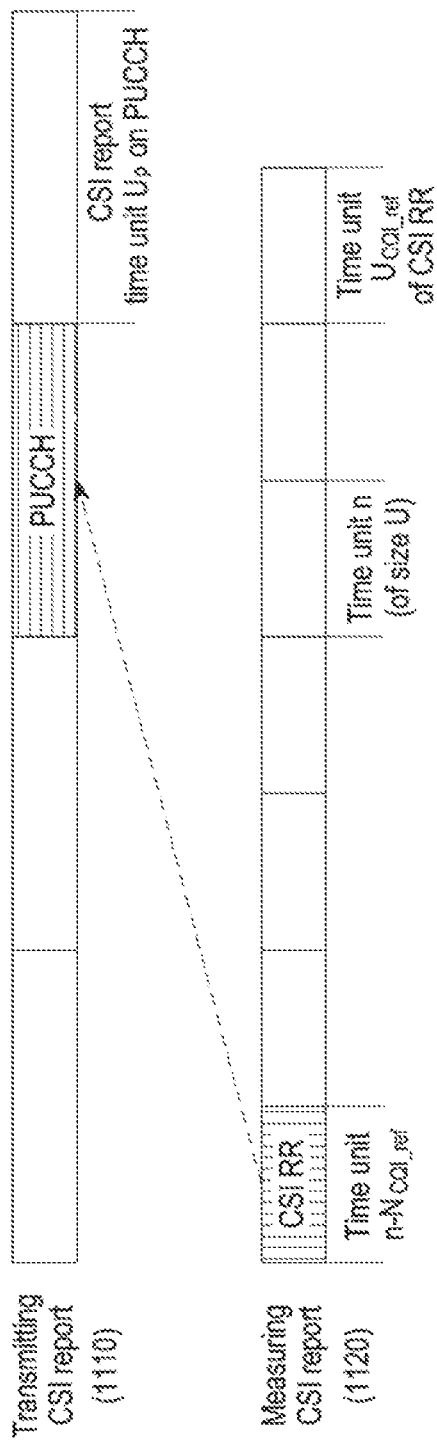
FIG. 11 schematically illustrates a corresponding relationship between periodic CSI report and CSI reference resource in the exemplary embodiment 4.

In the time domain, if, in a cell, UE reports CSI report on a PUCCH(s) or a PUSCH(s) during the time unit n, all or some of the PUCCH(s) or the PUSCH(s) may be transmitted during the time unit n. If UE configures transmission modes 1-9, or configures transmission mode 10 and only one CSI report process, the CSI reference resource is in the time unit n-$N_{CQI\_ref}$. In such a situation, all or some of the CSI reference resource may be transmitted during the time unit n-$N_{CQI\_ref}$. For example, as shown in FIG. 11, a preceding part of PUCCH for transmitting periodic CSI report 1110 is transmitted during the time unit n, and CSI reference resource 1120 is transmitted during the time unit n-$N_{CQI\_ref}$. The time unit n-$N_{CQI\_ref}$ is an effective downlink time unit or a special time unit. $N_{CQI\_ref}$ satisfies the condition of $N_{CQI\_ref} \geq S1$.

In the time domain, if, in a cell, UE reports CSI report on a PUCCH(s) or a PUSCH(s) during the time unit n, all or some of the PUCCH(s) or the PUSCH(s) may be transmitted during the time unit n. If UE configures transmission mode 10 and a plurality of CSI report processes, CSI reference resource of each CSI report process is in the time unit n-$N_{CQI\_ref}$. In such a situation, all or some of the CSI reference resource may be transmitted during the time unit n-$N_{CQI\_ref}$. For example, as shown in FIG. 11, a preceding part of the PUCCH for transmitting periodic CSI report 1110 is transmitted during the time unit n, and the CSI reference resource 1120 is transmitted during the time unit n-$N_{CQI\_ref}$. The time unit n-$N_{CQI\_ref}$ is an effective downlink time unit or a special time unit. For FDD, $N_{CQI\_ref}$ satisfies the condition of $N_{CQI\_ref} \geq S2$. For TDD, if UE configures 2 or 3 CSI report processes, $N_{CQI\_ref}$ satisfies the condition of $N_{CQI\_ref} \geq S1$. For TDD, if UE configures 4 CSI report processes, $N_{CQI\_ref}$ satisfies the condition of $N_{CQI\_ref} \geq S2$.

Exemplary Embodiment 5

How to determine the time offset $N_{CQI\_ref}$ of CSI report time domain position relative to the time domain position of CSI reference resource will be described in this exemplary embodiment. Because time unit for CSI report measurement and time unit for PUCCH preparation may be different due to different durations of the time unit of the CSI reference resource and of the time unit of PUCCH, it is necessary to determine a minimum time delay ($N_{CQI\_ref}$) between the CSI reference resource and the CSI report according to the time unit ($U_{CQI\_ref}$) of the CSI reference resource and the time unit (i.e., $U_p$) of the PUCCH for the CSI report.

With respect to a cell, $N_{CQI\_ref}$ may be determined according to the transmission mode configured by UE and the number of CSI report process in the way described in the exemplary embodiment 3 or 4. For example, $N_{CQI\_ref}$ satisfies the condition of $N_{CQI\_ref} \geq S$, wherein S is a positive integer. The value of S depends on the transmission mode configured by UE and the number of CSI report processes. Specifically, when UE configures transmission modes 1-9 or configures transmission mode 10 but only one CSI report process, S is equal to S1; and when UE configures transmission mode 10 and more than one CSI report processes, S is equal to S2. Respective values of S1 and S2 may be determined in the way described in the exemplary embodiment 3 or 4.

If a plurality of cells are configured for UE, the respective values of S1 and S2 depends on neither $U_{CQI\_ref}$ nor $U_p$. This is because the value of S1 and that of S2 are same when the transmission modes configured for respective cells are same and the numbers of CSI report processes configured by respective cells in which a plurality of CSI report processes are configured are same.

It is to be noted, when there is multiple pieces of effective CSI reference resource in a time unit, a piece of effective CSI reference resource may be selected according to a predefined rule. For example, the last reference resource may be selected to obtain a more accurate measured CS, or the earliest reference resource may be selected to decrease the time delay of process.

Exemplary Embodiment 6

How to determine the time offset $N_{CQI\_ref}$ of CSI report time domain position relative to the time domain position of CSI reference resource will be described in this exemplary embodiment.

For a cell, the time unit U of the CSI reference resource corresponding to CSI report may be determined in a way described in the exemplary embodiment 3 or 4 (U may be specified by base station, or determined according to the values of $U_p$, $U_{OFFSET1}$ and $U_{CQI\_ref}$). Then, $N_{CQI\_ref}$ may be determined according to transmission mode and the number of CSI report processes configured by UE, the time unit ($U_p$) of the PUCCH for transmitting CSI report and the time unit (i.e., $U_{CQI\_ref}$) of the CSI reference resource. $N_{CQI\_ref}$ satisfies the condition of $N_{CQI\_ref} \geq S$, wherein S is a positive integer. Two examples are provided hereinafter to illustrate how to determine.

(1) The value of S may be configured by a RRC layer signaling, determined by an indication from a MAC layer signaling, determined by an indication from a physical layer signaling, indicated by system information, predefined by a protocol, or determined by a space size of a subcarrier for transmitting periodic CSI report. Alternatively the value of S may be determined according to an attribute of CSI reference resource, for example, a space size of a subcarrier for CSI reference resource or $U_{CQI\_ref}$.

(2) The value of S may be determined by at least one of transmission mode and the number of CSI report processes configured by UE, a time unit ($U_p$) of a PUCCH for transmitting CSI report and a time unit ($U_{CQI\_ref}$) of CSI reference resource. For example, the value of S may be determined in the way as shown in Table 6, in which the respective values of the parameters may be predefined.

TABLE 6

| Transmission modes of cell and numbers of CSI report processes | Time unit $U_p$ of PUCCH for CSI report | Time unit $U_{CQI\_ref}$ of CSI reference resource | Value of S |
| --- | --- | --- | --- |
| a1 | b1 | c1 | s1 |
| a2 | b2 | c2 | s2 |
| a3 | b3 | c3 | s3 |
| a4 | b4 | c4 | s4 |
| a5 | b5 | c5 | s5 |
| a6 | b6 | c6 | s6 |
| a7 | b7 | c7 | s7 |

Exemplary Embodiment 7

How to determine the time offset $N_{CQI\_ref}$ of CSI report time domain position relative to the time domain position of CSI reference resource will be described in the this exemplary embodiment.

Figure 12:
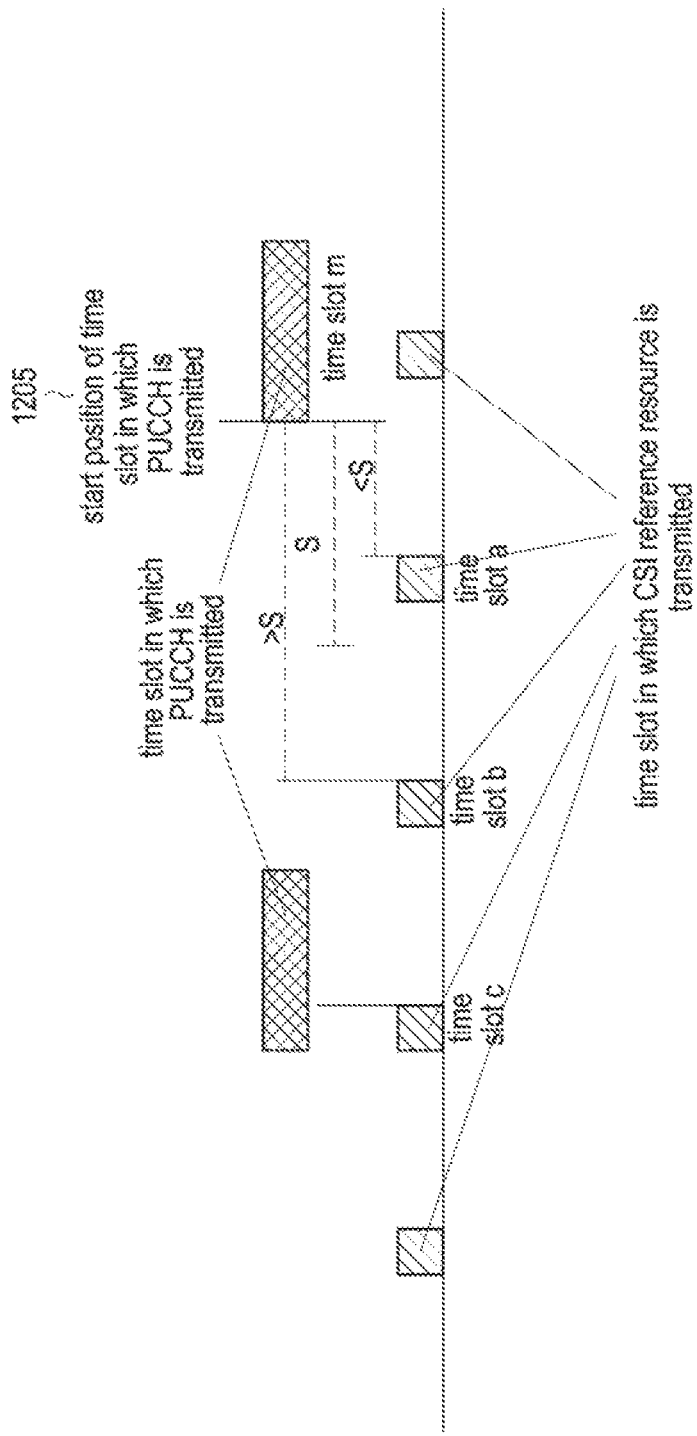
FIG. 12 schematically illustrates a corresponding relationship between periodic CSI report and CSI reference resource in an exemplary embodiment 7.
Figure 13:
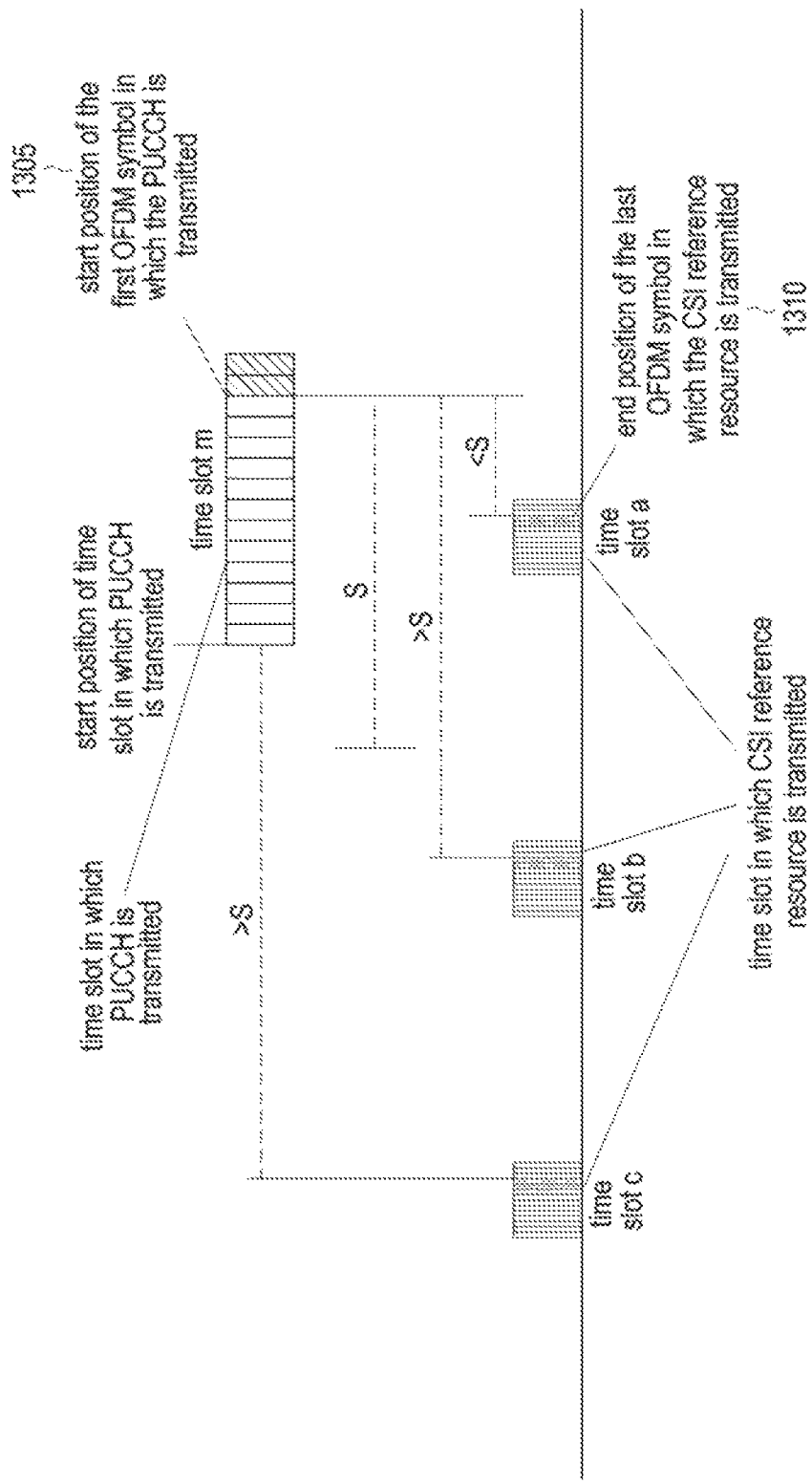
FIG. 13 schematically illustrates a corresponding relationship between periodic CSI report and CSI reference resource in the exemplary embodiment 7.

FIGS. 12 and 13 schematically illustrate corresponding relationships between periodic CSI report and CSI reference resource in an exemplary embodiment 7 respectively.

For a cell, the time unit of the time correspondence between CSI reference resource (e.g., CSI-RS) and CSI report is an absolute time unit (e.g., microsecond (p), or time domain sampling value (e.g., 1/4096*480*1000 second)).

The CSI reference resource on which the CSI report is based is CSI reference resource before the CSI report, and the time interval $N_{CQI\_ref}$ between the start position of the time slot in which the PUCCH for transmitting CSI report is transmitted and the end position of the time slot in which the CSI reference resource is transmitted, satisfies a condition of $N_{CQI\_ref} \geq S$ (S is an absolute time interval, e.g., 2 milliseconds or 2.5 milliseconds). The value of S may be configured by a UE specific higher layer signaling, predefined by a protocol, or determined in other ways. For different cells, the value of S may be configured independently, and configuring the value of S independently may achieve a better effect, since the subcarrier spaces of different cells are different, or the number of CSI report processes configured or the time delay of CSI report calculation processes may vary among different cells. A same value of S may be configured for different cells for the sake of simplicity). $N_{CQI\_ref}$ is a minimum value that can satisfy the above condition.

As shown in FIG. 12, the time interval between the start position 1205 of the time slot m in which the PUCCH for transmitting CSI report is transmitted and the end position of the time slot a in which the CSI reference resource is transmitted, is smaller than S, therefore the CSI reference resource transmitted in the time slot a is not the reference resource for the CSI reported in the time slot m; the time interval between the start position 1205 of the time slot m in which the PUCCH for transmitting CSI report is transmitted and the end position of the time slot b in which the CSI reference resource is transmitted, is larger than S, and the end position of time slot b is nearest to the start position 1205 of the time slot m for the PUCCH, therefore the CSI reference resource of the time slot b is the reference resource for the CSI reported in the time slot m; the time interval between the start position 1205 of the time slot m in which the PUCCH for transmitting CSI report is transmitted and the end position of the time slot c in which the CSI reference resource is transmitted, is larger than S, but the time interval between the end position of time slot c and the start position 1205 of the time slot m for the PUCCH is larger than the time interval between the time slot b and the start position 1205 of the time slot m for the PUCCH, therefore the CSI reference resource of the time slot c is not the reference resource for the CSI reported in the time slot m.

Alternatively, for a cell, the time unit of the time correspondence between CSI reference resource (e.g., CSI-RS) and CSI report is an absolute time unit (e.g., microsecond (µs), or time domain sampling value (e.g., 1/4096*480*1000 second)). The CSI reference resource on which the CSI report is based is CSI reference resource before the CSI report, and the time interval $N_{CQI\_ref}$ between the start position of the first OFDM symbol in which the PUCCH for transmitting CSI report is transmitted and the end position of the last OFDM symbol in which the CSI reference resource is transmitted, satisfies a condition of $N_{CQI\_ref} \geq S$ (S is an absolute time interval, e.g., 2 milliseconds or 2.5 milliseconds). The value of S may be configured by a UE specific higher layer signaling, predefined by a protocol, or determined in other ways. For different cells, the value of S may be configured independently, and configuring the value of S independently may achieve a better effect, since the subcarrier spaces of different cells are different, the number of CSI report processes configured or the time delay of CSI report calculation processes may vary among different cells. A same value of S may be configured for different cells for the sake of simplicity). $N_{CQI\_ref}$ is a minimum value that can satisfy above condition.

As shown in FIG. 13, the time interval between the start position 1305 of the first OFDM symbol of the PUCCH in the time slot m in which the PUCCH for transmitting CSI report is transmitted and the end position 1310 of the last OFDM symbol of the CSI reference resource in the time slot a in which the CSI reference resource is transmitted, is smaller than S, therefore the CSI reference resource transmitted in the time slot a is not the reference resource for the CSI reported in the time slot m; the time interval between the start position 1305 of the first OFDM symbol of PUCCH in the time slot m in which the PUCCH for transmitting CSI report is transmitted and the end position 1310 of the last OFDM symbol for transmitting CSI reference resource in the time slot b, is larger than S, and the end position 1310 of the last OFDM symbol for transmitting CSI reference resource in the time slot b is nearest to the start position 1305 of the first OFDM symbol of PUCCH in the time slot m of PUCCH, therefore the CSI reference resource transmitted in the time slot b is the CSI reference resource for the CSI reported in the time slot m; the time interval between the start position 1305 of the first OFDM symbol of PUCCH in the time slot m in which the PUCCH for transmitting CSI report is transmitted and the end position 1310 of the last OFDM symbol for transmitting the CSI reference resource in the time slot c, is larger than S, but the end position 1310 of the last OFDM symbol transmitting CSI reference resource in the time slot c is not nearest to the start position of the first OFDM symbol of PUCCH in the time slot m of PUCCH, therefore the CSI reference resource transmitted in the time slot c is not the reference resource of the CSI reported in the time slot m.

Figure 14:
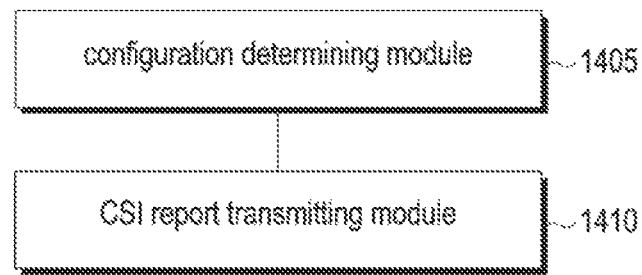
FIG. 14 is a block diagram illustrating a user equipment for transmitting channel state information report according to an exemplary embodiment of the present disclosure.

FIG. 14 is a block diagram illustrating a user equipment for transmitting channel state information report according to an exemplary embodiment of the present disclosure.

Referring to FIG. 14, the UE comprises:

a configuration determining module 1405 configured to determine CSI transmission configuration information that comprises transmission times of periodic CSI report in one subframe; and a CSI transmitting module 1410 configured to transmit CSI report according to the CSI transmission configuration information.

The operations of the configuration determining module 1405 and the CSI report transmitting module 1410 correspond respectively to the step 101 and step 102 of the method for CSI report described above.

It can be seen from the above detailed description of the embodiments of the present disclosure, embodiments of the present disclosure has at least the following advantageous technical effects as compared to the prior art:

1. UE is allowed to transmit periodic CSI report more than once in a subframe, which makes the transmission period of periodic CSI report smaller than the time length of a subframe and thus allows introducing a smaller time unit for data scheduling and configuring a smaller CSI report period. Therefore, the transmission efficiency of UCI may be improved in a higher frequency spectrum resource environment of 5G technology.

2. UCI of data scheduling units of different time length may be transmitted jointly in different cells by refining respective granularities of the CSI report period and the time unit thereof as well as the offset of CSI reference resource and the time unit thereof. Therefore, the transmission performance of UCI may be ensured.

3. Parameters of CSI report may be configured variously, such as according to a RRC layer signaling, a MAC layer signaling, a physical layer signaling, system information, a predefinition in a protocol or the like. Different CSI report periods and time units thereof may be combined with different CSI reference resource offsets and time units thereof. Therefore, the flexibility and expandability of communication system configuration may be improved.

It should be understood that the system, device and method disclosed in the embodiments of the present disclosure can be implemented in other ways. For example, the device described above is only illustrative. For example, units are defined only according to logical function, and they may also be implemented in other way of definition in practice. For example, more than one unit or element can be combined or integrated into another system, or some features may be ignored or not be implemented. In addition, coupling or direct coupling or communication connection illustrated or discussed may be indirect coupling or communication connection through some interface, device or unit, and may be electrical, mechanical, or in other format.

Units that are described individually may be physically separated or not. A component illustrated as a unit may be a physical unit or not, that is, it can be located at one place or distributed on a plurality of network units. Some or all of the units may be selected as required in order to achieve the objects of the embodiments.

In addition, each function unit in each embodiment of the present disclosure can be integrated into one processing unit or individually exist physically. Alternatively, two or more units may be integrated into one unit. The above integrated unit may be implemented through either hardware or a software functional unit.

Particular aspects of the present disclosure may be implemented as a computer-readable code in a computer-readable recording medium. The computer-readable recording medium may be a data storage device, which can store data which can be read by a computer system. Examples of the computer readable recording medium may include a Read-Only Memory (ROM), a Random Access Memory (RAM), a CD-ROM, a magnetic tape, a floppy disk, an optical data storage device, and a carrier wave (such as data transmission through the Internet). The computer-readable recording medium may be distributed through computer systems connected to the network, and accordingly, the computer-readable code may be stored and executed in a distributed manner. Further, functional programs, codes and code segments for achieving the present disclosure may be easily interpreted by programmers skilled in the art which the present disclosure pertains to.

The above-described methods and apparatuses according to embodiments of the present disclosure may be implemented in the form of hardware, software, or a combination of hardware and software. Any such software may be stored, e.g., in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. A method according to an embodiment of the present disclosure may be implemented by a computer or portable terminal including a controller and a memory, wherein the memory is one example of machine-readable storage media suitable to store a program or programs including instructions for implementing the embodiments of the present disclosure.

Accordingly, the present disclosure includes a program for a code that implements the apparatus and method described in the appended claims of the specification and a machine (a computer or the like)-readable storage medium for storing the program. Further, the program may be electronically carried by any medium such as a communication signal transferred through a wired or wireless connection, and the present disclosure appropriately includes equivalents thereof.

Further, an apparatus according to various embodiments of the present disclosure may receive the program from a program providing device that is wiredly or wirelessly connected thereto, and may store the program. The program providing device may include a program including instructions through which a program processing device performs a preset content protecting method, a memory for storing information required for the content protecting method, a communication unit for performing wired or wireless communication with the program processing device, and a controller for transmitting the corresponding program to a transceiver at the request of the program processing device or automatically.

While the present disclosure has been particularly shown and described with reference to certain embodiments thereof, it will be understood by those of ordinary skill in the art that various changes in form and details may be made therein without departing from the scope of the present disclosure as defined by the following claims and their equivalents.

The invention claimed is:

1. A method performed by a terminal for transmitting a channel state information (CSI) report in a wireless communication system, the method comprising:
   identifying a CSI reference resource in a first downlink slot, which precedes a second downlink slot by a time offset, wherein the second downlink slot corresponds to an uplink slot for a CSI reporting;
   receiving, from a base station, a CSI reference signal (CSI-RS) on the identified CSI reference resource; and
   transmitting, to the base station on a physical uplink control channel (PUCCH), the CSI report for the received CSI-RS in the uplink slot based on an uplink subcarrier space size, and
   wherein the time offset is a smallest value greater than or equal to a positive integer identified based on a downlink subcarrier space size, in case that the CSI reporting is a periodic CSI reporting.

2. The method of claim 1, wherein the first downlink slot is identified further based on the uplink subcarrier space size.

3. The method of claim 1, wherein, in case that the downlink subcarrier space size is larger than or equal to the uplink subcarrier space size, at least two downlink slots including the second downlink slot correspond to the uplink slot for the PUCCH, and
   wherein the second downlink slot is a former one among the at least two downlink slots.

4. The method of claim 1, wherein, in case that the downlink subcarrier space size is smaller than the uplink subcarrier space size, the second downlink slot corresponds to at least two uplink slots including the uplink slot for the PUCCH.

5. A method performed by a base station for receiving a channel state information (CSI) report in a wireless communication system, the method comprising:
   transmitting, to a terminal, a CSI reference signal (CSI-RS) on a CSI reference resource; and
   receiving, from the terminal on a physical uplink control channel (PUCCH), the CSI report for the transmitted CSI-RS in an uplink slot based on an uplink subcarrier space size, wherein the CSI reference resource is in a first downlink slot, which precedes a second downlink slot by a time offset, and wherein the second downlink slot corresponds to the uplink slot for a CSI reporting, and wherein the time offset is a smallest value greater than or equal to a positive integer depending on a downlink subcarrier space size, in case that the CSI reporting is a periodic CSI reporting.

6. The method of claim 5, wherein the first downlink slot is identified further based on the uplink subcarrier space size.

7. The method of claim 5, wherein, in case that the downlink subcarrier space size is larger than or equal to the uplink subcarrier space size, at least two downlink slots including the second downlink slot correspond to the uplink slot for the PUCCH, and wherein the second downlink slot is a former one among the at least two downlink slots.

8. The method of claim 5, wherein, in case that the downlink subcarrier space size is smaller than the uplink subcarrier space size, the second downlink slot corresponds to at least two uplink slots including the uplink slot for the PUCCH.

9. A terminal for transmitting a channel state information (CSI) report in a wireless communication system, the terminal comprising:

a transceiver configured to transmit or receive a signal; and a controller coupled with the transceiver and configured to:

identify a CSI reference resource in a first downlink slot which precedes a second downlink slot by a time offset, wherein the second downlink slot corresponds to an uplink slot for a CSI reporting, receive, from a base station, a CSI reference signal (CSI-RS) on the identified CSI reference resource, and transmit, to the base station on a physical uplink control channel (PUCCH), the CSI report for the received CSI RS in the uplink slot based on an uplink subcarrier space size, wherein the time offset is a smallest value greater than or equal to a positive integer identified based on a downlink subcarrier space size, in case that the CSI reporting is a periodic CSI reporting.

10. The terminal of claim 9, wherein the first downlink slot is identified further based on the uplink subcarrier space size.

11. The terminal of claim 9, wherein, in case that the downlink subcarrier space size is larger than or equal to the uplink subcarrier space size, at least two downlink slots including the second downlink slot correspond to the uplink slot for the PUCCH, and wherein the second downlink slot is a former one among the at least two downlink slots.

12. The terminal of claim 9, wherein, in case that the downlink subcarrier space size is smaller than the uplink subcarrier space size, the second downlink slot corresponds to at least two uplink slots including the uplink slot for the PUCCH.

13. A base station for receiving a channel state information (CSI) report in a wireless communication system, the base station comprising:

a transceiver configured to transmit or receive a signal; and a controller coupled with the transceiver and configured to:

transmit, to a terminal, a CSI reference signal (CSI-RS) on a CSI reference resource, and receive, from the terminal on a physical uplink control channel (PUCCH), the CSI report for the transmitted CSI-RS in an uplink slot based on an uplink subcarrier space size, wherein the CSI reference resource is in a first downlink slot, which precedes a second downlink slot by a time offset, wherein the second downlink slot corresponds to the uplink slot for a CSI reporting, and wherein the time offset is a smallest value greater than or equal to a positive integer depending on a downlink subcarrier space size, in case that the CSI reporting is a periodic CSI reporting.

14. The base station of claim 13, wherein the first downlink slot is identified further based on the uplink subcarrier space size.

15. The base station of claim 13, wherein, in case that the downlink subcarrier space size is larger than or equal to the uplink subcarrier space size, at least two downlink slots including the second downlink slot correspond to the uplink slot for the PUCCH, and wherein the second downlink slot is a former one among the at least two downlink slots.

16. The base station of claim 13, wherein, in case that the downlink subcarrier space size is smaller than the uplink subcarrier space size, the second downlink slot corresponds to at least two uplink slots including the uplink slot for the PUCCH.

* * * * *